US010631333B2

(12) United States Patent
Zhang et al.

(10) Patent No.: US 10,631,333 B2
(45) Date of Patent: Apr. 21, 2020

(54) SYNCHRONIZED MEDIUM SHARING WITH PRIVATE NETWORK

(71) Applicant: QUALCOMM Incorporated, San Diego, CA (US)

(72) Inventors: Xiaoxia Zhang, San Diego, CA (US); Jing Sun, San Diego, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/028,993

(22) Filed: Jul. 6, 2018

(65) Prior Publication Data

US 2020/0015268 A1 Jan. 9, 2020

(51) Int. Cl.
*H04W 74/04* (2009.01)
*H04W 74/00* (2009.01)
*H04W 84/04* (2009.01)

(52) U.S. Cl.
CPC ......... *H04W 74/04* (2013.01); *H04W 74/002* (2013.01); *H04W 84/042* (2013.01)

(58) Field of Classification Search
CPC ........................... H04W 74/04; H04W 74/002
See application file for complete search history.

(56) References Cited

U.S. PATENT DOCUMENTS

| 2013/0100952 | A1 | 4/2013 | Hart et al. | |
| 2013/0155953 | A1* | 6/2013 | Chu | H04W 28/20 370/328 |
| 2016/0323849 | A1* | 11/2016 | Chu | H04W 72/04 |
| 2018/0184453 | A1* | 6/2018 | Viger | H04W 74/085 |
| 2018/0199375 | A1* | 7/2018 | Nezou | H04W 74/006 |
| 2019/0037565 | A1* | 1/2019 | Zheng | H04W 72/0446 |
| 2019/0053222 | A1* | 2/2019 | Bhorkar | H04W 16/14 |

FOREIGN PATENT DOCUMENTS

WO 2012172157 A1 12/2012

OTHER PUBLICATIONS

International Search Report and Written Opinion—PCT/US2019/039801—ISA/EPO—dated Sep. 18, 2019.

* cited by examiner

*Primary Examiner* — Albert T Chou
(74) *Attorney, Agent, or Firm* — Liem T. Do

(57) ABSTRACT

Wireless communications systems and methods related to sharing a communication medium with private networks are provided. In one embodiment, a first wireless communication device communicates with a second wireless communication device during a first transmission opportunity (TXOP) in a spectrum, a channel reservation signal to reserve a second TXOP in the spectrum subsequent to the first TXOP. The first wireless communication device communicates, with the second wireless communication device during the second TXOP, a communication signal. In one embodiment, a first wireless communication device monitors, during a first TXOP in a spectrum, for a channel reservation signal to reserve a second TXOP in the spectrum by a second wireless communication device of a priority operator, the second TXOP being subsequent to the first TXOP. The first wireless communication device determines whether to communicate with a third wireless communication device during the second TXOP based on the monitoring.

26 Claims, 11 Drawing Sheets

SYNCHRONIZED MEDIUM SHARING WITH PRIVATE NETWORK

TECHNICAL FIELD

This application relates to wireless communication systems, and more particularly to sharing a communication medium with private networks.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the LTE technology to a next generation new radio (NR) technology. For example, NR is designed to provide a lower latency, a higher bandwidth or throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum. For example, the NR spectrum sharing technologies can be extended into new types of deployments such as private networks for industrial Internet of Things (IoT).

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication includes communicating, by a first wireless communication device with a second wireless communication device during a first transmission opportunity (TXOP) in a spectrum, a channel reservation signal to reserve a second TXOP in the spectrum subsequent to the first TXOP; and communicating, by the first wireless communication device with the second wireless communication device during the second TXOP, a communication signal.

In an additional aspect of the disclosure, a method of wireless communication includes monitoring, by a first wireless communication device during a first transmission opportunity (TXOP) in a spectrum, for a channel reservation signal to reserve a second TXOP in the spectrum by a second wireless communication device of a priority operator, the second TXOP being subsequent to the first TXOP; and determining, by the first wireless communication device, whether to communicate with a third wireless communication device during the second TXOP based on the monitoring.

In an additional aspect of the disclosure, an apparatus includes a transceiver configured to communicate, with a wireless communication device during a first transmission opportunity (TXOP) in a spectrum, a channel reservation signal to reserve a second TXOP in the spectrum subsequent to the first TXOP; and communicate, with the wireless communication device during the second TXOP, a communication signal.

In an additional aspect of the disclosure, an apparatus includes a processor configured to monitor, during a first transmission opportunity (TXOP) in a spectrum, for a channel reservation signal to reserve a second TXOP in the spectrum by a first wireless communication device of a priority operator, the second TXOP being subsequent to the first TXOP; and determine whether to communicate with a second wireless communication device during the second TXOP based on the monitoring.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
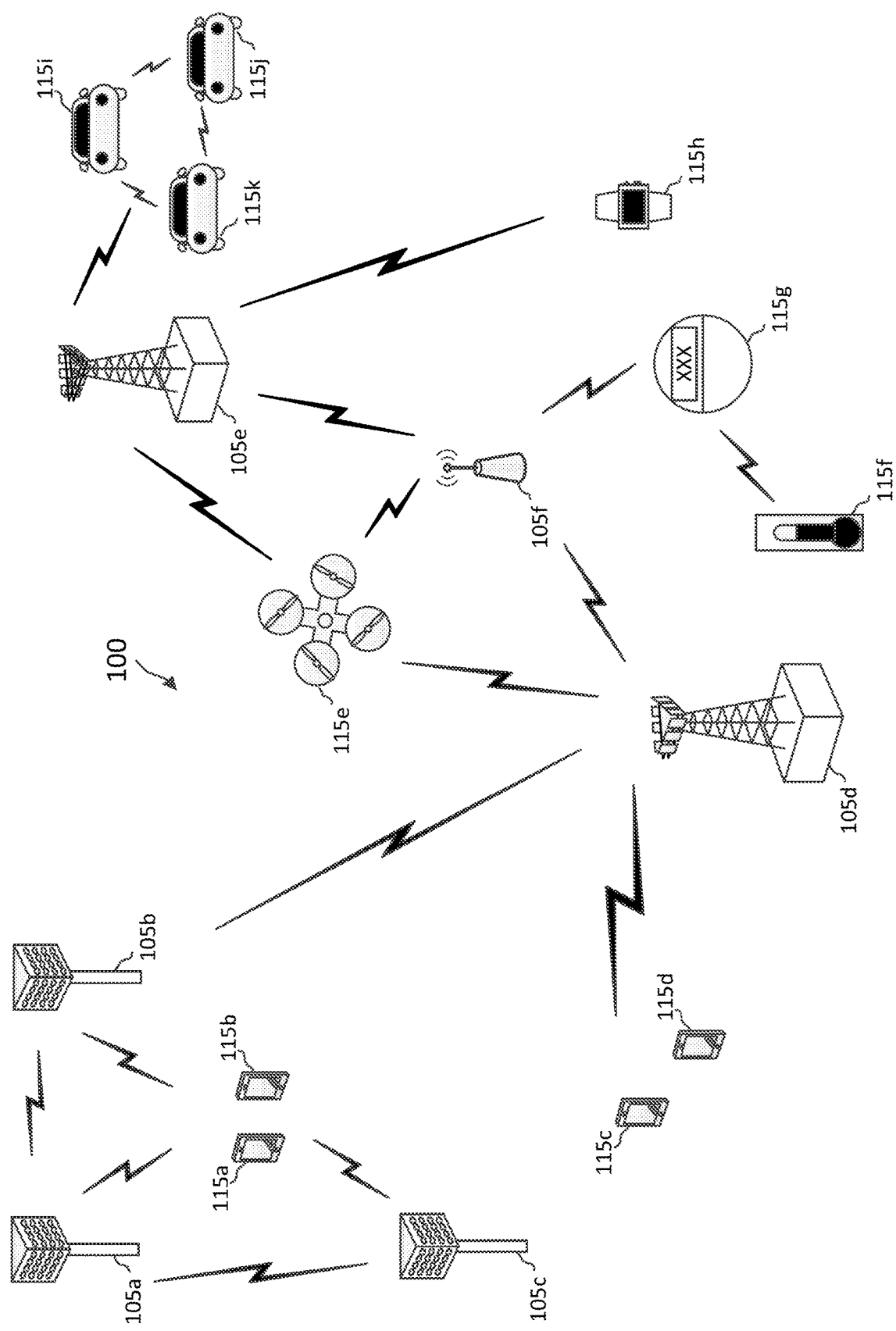
FIG. 1 illustrates a wireless communication network according to some embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2"(3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3GHz FDD/TDD implementations, subcarrier spacing may occur with 15 kHz, for example over 1, 5, 10, 20 MHz, and the like BW. For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

The NR spectrum sharing technologies can enable new deployments such as private networks for factory automation. Factory automation has been widely used in industry where motors, machines, and/or devices are controlled automatically. The control signaling used in automation is typically transmitted via cables. There have been proposals to replace legacy industrial cables with wireless communication networks. However, factories may typically operate in a private network environment and may not have a licensed spectrum for wireless communications.

One approach to enabling wireless networking for factory automation without a licensed spectrum is to use WiFi technology. However, WiFi technology may not be easily scaled to support a massive number of nodes (e.g., motors, machines, and/or devices under automation controls) that are typically in a factory under automation control. In another approach, a mobile network operator (MNO) can lease a licensed spectrum of the MNO or at least some portions of the licensed spectrum in a given area to a factory network (e.g., a private network). However, the factory network can impact the performance of nearby mobile users. In yet another approach, an MNO may manage nodes in a factory network as subscribers. However, the management of a massive number of nodes in a factory network may require a significant effort from the MNO.

The present application describes mechanisms for a sharing a communication medium with private networks using synchronized medium sharing techniques. In synchronized medium sharing, a spectrum can be time-partitioned into transmission opportunities (TXOPs) and different entities can shared the spectrum based on priorities and reservations in each TXOP. In each TXOP, a high-priority base station (BS) may transmit a channel reservation request signal to reserve a TXOP to trigger a user equipment (UE) for communication in the TXOP. In response, the triggered UE may transmit a channel reservation response signal and communicate a communication signal (e.g., UL data and/or DL data) with the BS based on the reservation. A low-priority node (e.g., a BS or a UE) may monitor for a channel reservation request signal and/or a channel reservation response signal from a high-priority node. The low-priority node may opportunistically access a TXOP when the TXOP is not reserved by a high-priority node. In a typical TXOP configuration, the channel reservation request signal transmission and the channel reservation response signal transmission are separated by an idle period or gap period to allow time for a triggered UE to process a received channel reservation request signal and for link direction switching. In addition, the channel reservation response signal transmission and the reserved communication are separated by another idle period or gap period to allow time for a low-priority node to process the monitoring of a channel reservation response signal and for link direction switching. The medium sensing overheads associated with the idle periods or gap periods can be significant when the TXOPs are configured with a short duration (e.g., at a slot-level) to minimize communication latencies.

The present disclose provides techniques to remove the channel reservation request signal processing time and/or the channel reservation response signal processing time from the gap periods by using various cross-TXOP reservation configurations. Accordingly, the present disclosure can reduce medium sensing overheads. While the disclosed embodiments are described in the context of an MNO sharing a spectrum of the MNO with one or more private networks, the disclosed embodiments can be applied to any synchronized medium sharing among any operating entities.

FIG. 1 illustrates a wireless communication network 100 according to some embodiments of the present disclosure. The network 100 may be a 5G network. The network 100 includes a number of base stations (BSs) 105 and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100 A UE 115 may also be a machine specifically configured for connected communication, including machine type communication (MTC), enhanced MTC (eMTC), narrowband IoT (NB-IoT) and the like. The UEs 115e-115k are examples of various machines configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink and/or uplink, or desired transmission between BSs, and backhaul transmissions between BSs.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-hop configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as in a vehicle-to-vehicle (V2V)

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In an embodiment, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes, for example, about 10. Each subframe can be divided into slots, for example, about 2. Each slot may be further divided into mini-slots. In a frequency-division duplexing (FDD) mode, simultaneous UL and DL transmissions may occur in different frequency bands. For example, each subframe includes a UL subframe in a UL frequency band and a DL subframe in a DL frequency band. In a time-division duplexing (TDD) mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In an embodiment, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining minimum system information (RMSI), and other system information (OSI)) to facilitate initial network access. In some instances, the BSs 105 may broadcast the PSS, the SSS, and/or the MIB in the form of synchronization signal blocks (SSBs) over a physical broadcast channel (PBCH) and may broadcast the RMSI and/or the OSI over a physical downlink shared channel (PDSCH).

In an embodiment, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The SSS may also enable detection of a duplexing mode and a cyclic prefix length. Some systems, such as TDD systems, may transmit an SSS but not a PSS. Both the PSS and the SSS may be located in a central portion of a carrier, respectively.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical uplink control channel (PUCCH), physical uplink shared channel (PUSCH), power control, SRS, and cell barring.

After obtaining the MIB, the RMSI and/or the OSI, the UE 115 can perform a random access procedure to establish a connection with the BS 105. For the random access procedure, the UE 115 may transmit a random access preamble and the BS 105 may respond with a random access response. Upon receiving the random access response, the UE 115 may transmit a connection request to the BS 105 and the BS 105 may respond with a connection response (e.g., contention resolution message).

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The BS 105 may transmit a DL communication signal to the UE 115 via a PDSCH according to a DL scheduling grant. The UE 115 may transmit a UL communication signal to the BS 105 via a PUSCH and/or PUCCH according to a UL scheduling grant.

In an embodiment, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some embodiments, a BS 105 may assign a pair of BWPs within the CC to a UE 115 for UL and DL communications. For example, the BWP pair may include one BWP for UL communications and one BWP for DL communications.

Figure 2:
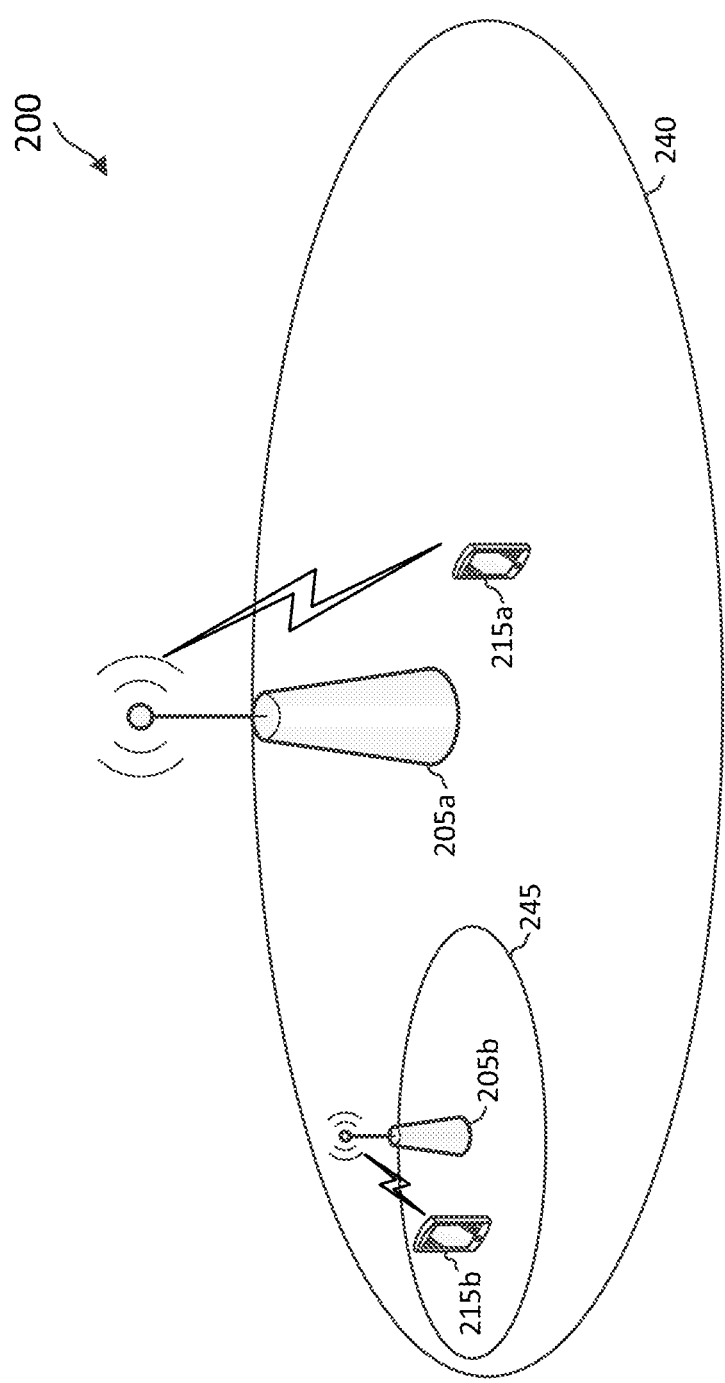
FIG. 2 illustrates an example of a wireless communications network that implements spectrum sharing according to embodiments of the present disclosure.

FIG. 2 illustrates an example of a wireless communications network 200 that implements spectrum sharing according to embodiments of the present disclosure. The network 200 may correspond to a portion of the network 100. FIG. 2 illustrates two BSs 205 and two UEs 215 for purposes of simplicity of discussion, though it will be recognized that embodiments of the present disclosure may scale to many more UEs 215 (e.g., about 3, 4, 5, 6 or more) and/or many more BSs 205 (e.g., about 3, 4 or more). The BSs 205 and the UEs 215 may be similar to the BSs 105 and the UEs 115, respectively. The network 200 may be operated by multiple operators sharing a frequency spectrum. For example, Operator A may operate the BS 205*a* and the UE 215*a* in an area 240, and Operator B may operate the BS 205*b* and the UE 215*b* in an area 245. The BSs 205 and the UEs 215 may communicate over the same frequency spectrum.

In an embodiment, Operator A may be an MNO and Operator B may be a private network operator. The frequency spectrum may be allocated to the MNO or licensed by the MNO and shared by the private network operator in the area 245. For example, the private network operator may be a factory network, where industrial automation control signaling may be communicated over the shared frequency spectrum.

The sharing of the frequency spectrum may be based on priorities and reservations. A shared spectrum can be time-partitioned into multiple periods. The operators can be time-synchronized to facilitate the sharing of the spectrum. Each operator may be assigned with an access priority in each period. To support dynamic TDD, each link (e.g., a UL or a DL) within an operator may be assigned with an access priority in each period. The BSs 205 and the UEs 215 may communicate with each other in a period according to a corresponding operator priority and/or a corresponding link priority. The sharing mechanisms are described in greater detail herein.

Figure 3:
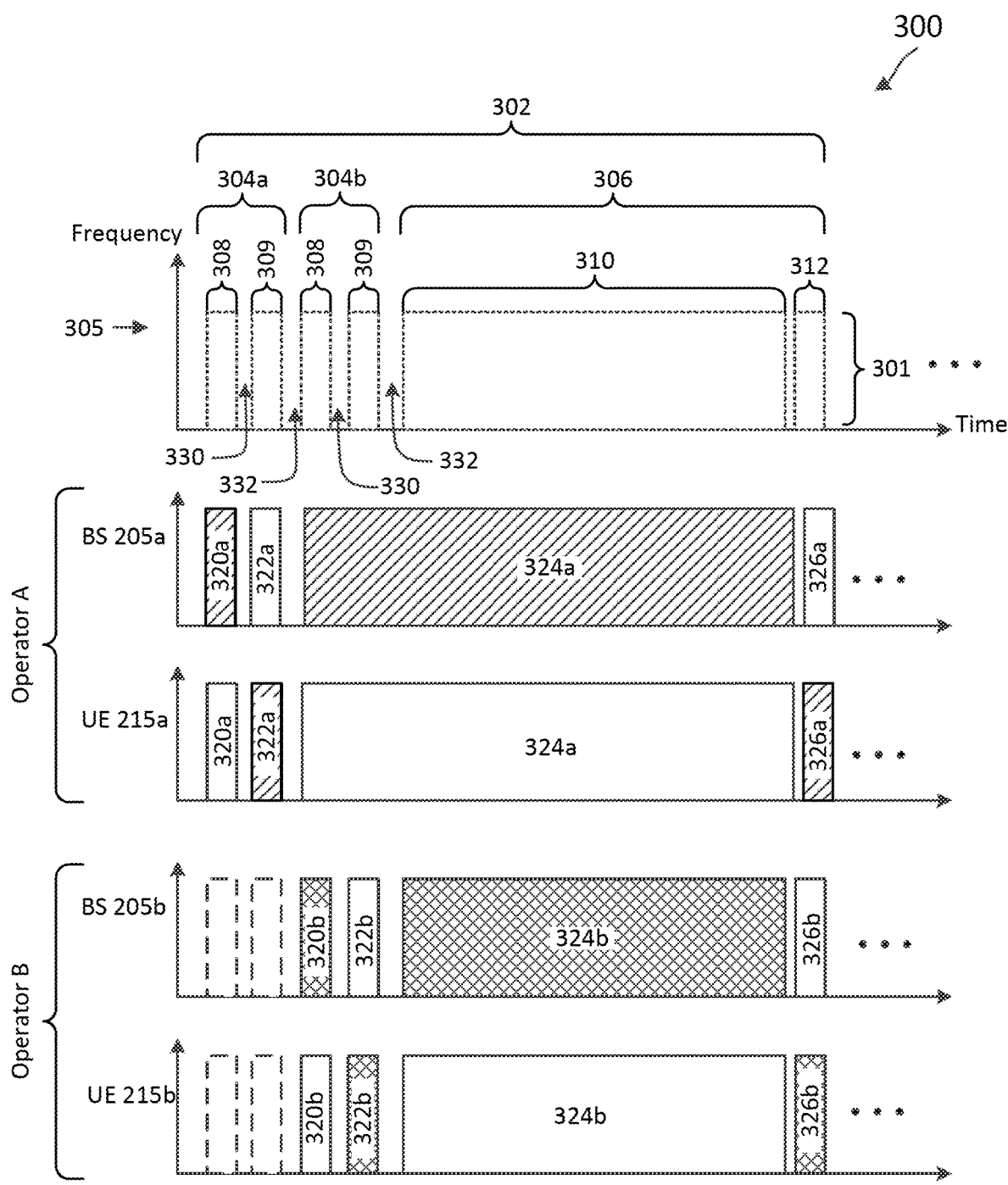
FIG. 3 illustrates a synchronized medium sharing scheme according to some embodiments of the present disclosure.

FIG. 3 illustrates a synchronized medium sharing scheme 300 according to some embodiments of the present disclosure. The x-axis represents time in some constant units. The y-axis represents frequency in some constant units. The scheme 300 may be employed by the BSs 105 and 205 and the UEs 115 and 215 to access a shared spectrum. In the scheme 300, the spectrum 301 is time-partitioned into a plurality of TXOPs 302 as shown in the frame structure 305. The TXOPs 302 may be defined in units of OFDM symbols, subframes, slots, and/or any suitable time format. Each TXOP 302 includes a plurality of medium sensing periods 304 followed by a transmission period 306. While the scheme 300 is illustrated with two operators (e.g., Operator A and Operator B), the scheme 300 can be applied to any suitable number of operators (e.g., about 3, 4 or more).

Each medium sensing period 304 is divided into a reservation period 308 and a response period 309. The reservation period 308 is used for transmitting a channel reservation request signal. The response period 309 can be used for transmitting a channel reservation response signal. The medium sensing periods 304 can be arranged in a decreasing order of priorities. Each operator is assigned with a particular priority in each TXOP 302. In other words, each medium sensing period 304 is used by a particular network operator based on the assigned priority. An operator node (e.g., the BSs 205 and the UEs 215) may transmit a reservation in an assigned medium sensing period 304 to reserve the following transmission period 306 for communications. A low-priority operator node can monitor the channel (e.g., the shared spectrum 301) during the medium sensing periods 304 of higher priorities. Upon detection of a reservation from a high-priority operator node, the low-priority operator node may refrain from transmitting in the following transmission period 306.

The transmission period 306 can be used for UL and/or DL transmissions. For example, the transmission period 306 may include two periods 310 and 312. The period 310 can have a longer duration than the period 312. For DL-centric communications, the period 310 can be used for DL data transmission and the period 312 can be used for UL control transmission. Alternatively, for UL-centric communications, the period 310 can be used for UL data transmission and the period 312 can be used for UL control transmission.

As an example, Operator A has priority over Operator B in the particular TXOP 302. As such, the high-priority medium sensing period 304*a* is assigned to Operator A and the low-priority medium sensing period 304*b* is assigned to Operator B. Thus, Operator A nodes has prioritized access in the transmission period 306, while Operator B nodes may opportunistically access the transmission period 306 when the transmission period 306 is not reserved by Operator A nodes.

For prioritized access, the BS 205*a* may transmit a channel reservation request signal 320*a* in the reservation period 308 of the medium sensing period 304*a* to reserve the following transmission period 306, for example, for a DL-centric transmission. The channel reservation request signal 320a can include a predetermined preamble, a request-to-send (RTS) signal, and/or a trigger signal (e.g., scheduling information) for a target UE (e.g., the UE 215a). In response, the UE 215a may transmit a channel reservation response signal 322a in the response period 309 of the medium sensing period 304a. The channel reservation response signal 322a can include a predetermined preamble, a clear-to-send (CTS) signal, and/or an SRS. In some instances, the channel reservation request signal 320a may be referred to as a CTS trigger signal. The BS 205b and the UE 215b may detect the channel reservation request signal 320a and/or the channel reservation response signal 322a and yield spectrum access to Operator A.

Subsequently, the BS 205a may communicate with the UE 215a in the transmission period 306. The transmission period 306 may begin after the medium sensing period 304a (e.g., occupying the low-priority medium sensing period 304b). The BS 205a may transmit a DL data signal 324a in the period 310 based on the DL scheduling information. The UE 215a may transmit a UL control signal 326a, for example, carrying scheduling request (SR) and/or hybrid automatic repeat request (HARQ) feedback information. The DL data signal 324a may carry DL data for the UE 215a.

For opportunistic access, the BS 205b and the UE 215b may listen for a reservation from high-priority operator nodes (e.g., the BS 205a and the UE 215a) in the medium sensing period 304a. When no reservation is detected, the BS 205b may access the TXOP 302 using similar mechanisms as the BS 205a. For example, the BS 205b sends a channel reservation request signal 320b in the reservation period 308 of the medium sensing period 304b. The UE 215b may send a channel reservation response signal 322b in the response period 309 of the medium sensing period 304b. Subsequently, the BS 205b may communicate with the UE 215b in the transmission period 306 as shown by a DL data signal 324b and a UL control signal 326b.

While the scheme 300 is described in the context of two operators sharing a communication medium, similar sharing mechanisms may be applied to facilitate dynamic TDD, where each link (e.g., UL and DL) of each operator may be assigned with a priority in each TXOP 302. For example, in each TXOP 302, Operator A may be assigned with a priority for UL communications and a priority for DL communications. Similarly, in each TXOP 302, Operator B may be assigned with a priority for UL communications and a priority for DL communications.

To minimize sharing complexity and overhead, an operator gaining access to a TXOP 302 may use the entire TXOP 302 for communications. Similarly, when the priority is per communication link, an operator gaining access to a TXOP 302 for a particular link direction may use the entire TXOP 302 for communications in the link direction. In other words, when a node has data to send in the middle of a TXOP 302, the node may not access the TXOP 302 even when the TXOP 302 is available and has to wait till the next TXOP 302.

As shown in the scheme 300, the reservation period 308 and the response period 309 in each medium sensing period 304 are separated by a gap period 330. The gap period 330 allows time for a UE to process a received channel reservation request signal 320 and to switch from a DL direction to a UL direction. A gap period 332 follows each medium sensing period 304 to allow time for a low-priority node to process the monitoring of a channel reservation response signal 322 and to switch from a UL direction to a DL direction. The DL-UL or UL-DL switching time is relatively short compared to the processing time for a channel reservation request signal 320 or a channel reservation response signal 322.

In an embodiment, an MNO may operate over a spectrum allocated or licensed to the MNO. The MNO may employ a synchronized priority-based medium sharing scheme similar to the scheme 300 to share at least a portion of the spectrum with a private network. The private network may be a wireless communication network in an industrial plant. The private network may include motors, machines, and/or devices (e.g., Internet of Things (IoT) devices) that are equipped with wireless communication devices or coupled to wireless communication devices. The private network may be used to carry control signaling for automation of the motors, machines, and/or devices. The synchronized priority-based sharing can provide a better medium sharing performance than asynchronous medium sharing (e.g., WiFi). In asynchronous sharing, a node may miss a preamble and cause a collision when the preamble is below an energy detection range, whereas in synchronous priority-based sharing, each node may know the specific timing of a medium sensing period (e.g., the medium sensing periods 304).

In synchronized priority-based sharing, the MNO can function as a priority user of the spectrum. The MNO may assign a spectrum access priority to each private network in each TXOP (e.g., the TXOPs 302). The MNO may vary the access priorities of the private networks over time. In an embodiment, the MNO may allow a certain private network to function as a priority user in certain TXOPs. For example, the MNO may assign the priorities based on the MNO's traffic load as well as requests (e.g., a priority request or a certain performance metric request) from the private networks. In some embodiments, the MNO can also allocate or assign certain dedicated resources for a private network to transmit discovery references signals (DRSs) (e.g., network synchronization signals and/or system information). The dedicated resources are designated to the assigned private network and may not be shared with another operating entity (e.g., the MNO or another private network).

To minimize communication delays, each TXOP can include a short duration (e.g., about 1 ms or less). For example, each TXOP 302 may include a single slot, such as a self-contained DL-centric slot as shown in FIG. 3 or a UL-centric slot. While communication delays can be reduced by defining TXOPs with a short duration, the medium sensing overhead (e.g., the gap periods 330 and 332) may become significant with the short TXOPs.

The present disclosure provides techniques for synchronized medium sharing with a reduced medium sensing overhead by using cross-slot or cross-TXOP reservations. Accordingly, the present disclosure allows an MNO to share a spectrum of the MNO with a private network efficiently.

Figure 4:
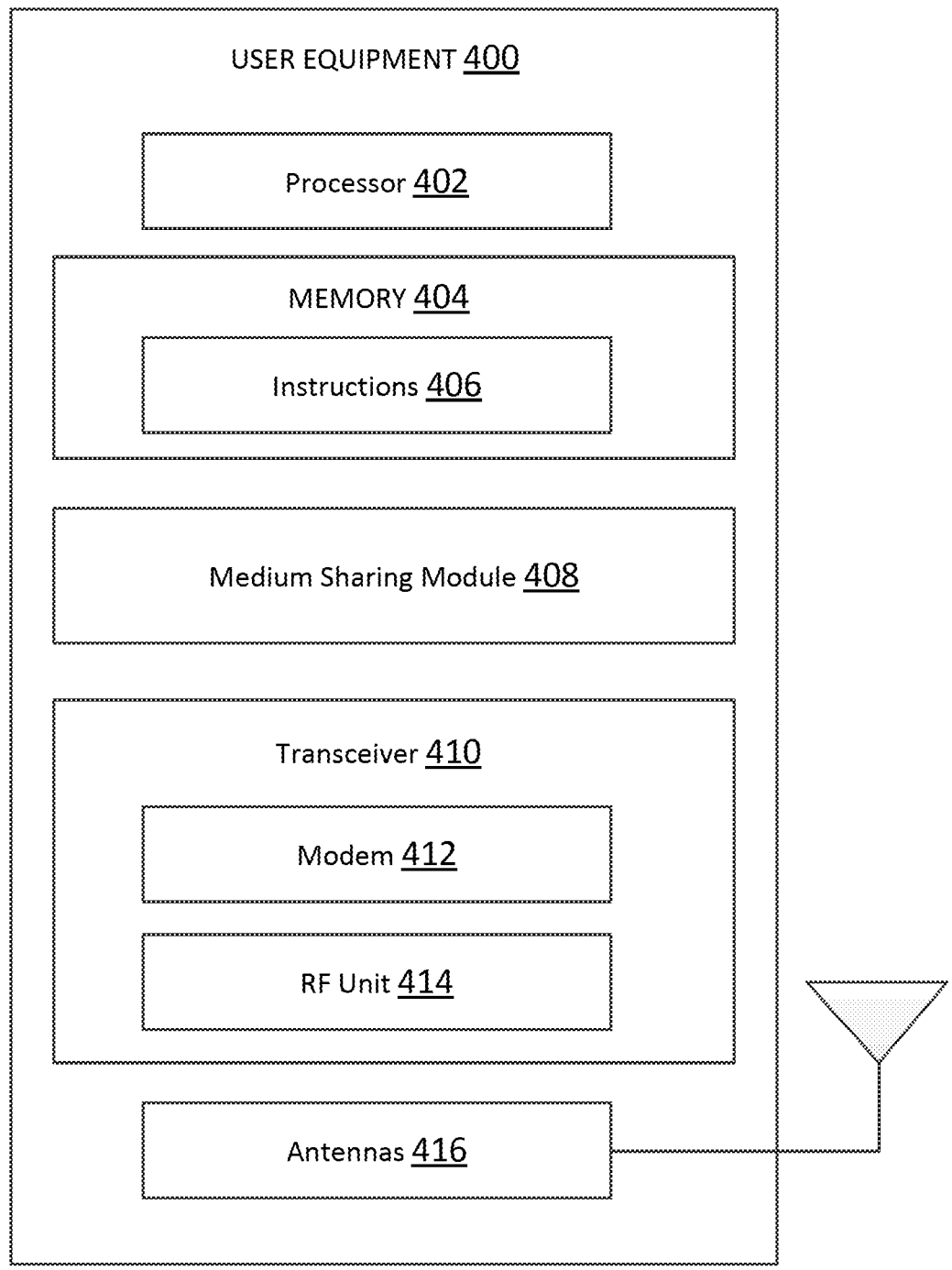
FIG. 4 is a block diagram of a user equipment (UE) according to some embodiments of the present disclosure.

FIG. 4 is a block diagram of an exemplary UE 400 according to embodiments of the present disclosure. The UE 400 may be a UE 115 or a UE 215 as discussed above. As shown, the UE 400 may include a processor 402, a memory 404, a medium sharing module 408, a transceiver 410 including a modem subsystem 412 and a radio frequency (RF) unit 414, and one or more antennas 416. These elements may be in direct or indirect communication with each other, for example via one or more buses.

The processor 402 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 404 includes a non-transitory computer-readable medium. The memory 404 may store instructions 406. The instructions 406 may include instructions that, when executed by the processor 402, cause the processor 402 to perform the operations described herein with reference to the UEs 115 in connection with embodiments of the present disclosure. Instructions 406 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The medium sharing module 408 may be implemented via hardware, software, or combinations thereof. For example, the medium sharing module 408 may be implemented as a processor, circuit, and/or instructions 406 stored in the memory 404 and executed by the processor 402. The medium sharing module 408 may be used for various aspects of the present disclosure. For example, the medium sharing module 408 is configured to perform medium sensing in a communication medium (e.g., the spectrum 301) by monitoring for a channel reservation request signal (e.g., the channel reservation request signal 320, an RTS signal, and/or a CTS trigger signal) and/or a channel reservation response signal (e.g., the channel reservation response signal 322) from high-priority nodes (e.g., the BSs 105 and 205 and/or the UEs 115 and 215), monitor for a CTS trigger signal (e.g., a channel reservation request signal 320 including scheduling information) from a serving BS (e.g., the BSs 105 and 205), respond to the CTS trigger signal by transmitting a channel reservation response signal or a CTS signal when no reservation is detected from a high-priority node, communicate with the serving BS based on the scheduling information, and/or yield spectrum access to a high-priority node based on medium sensing. The channel reservation response signal transmissions and/or the monitoring or medium sensing may be performed using various cross-slot or cross-TXOP reservation configurations.

In an embodiment, the medium sharing module 408 may receive a channel reservation request signal (e.g., a CTS trigger) from a serving BS in a current TXOP (e.g., the TXOP 302) reserving a next TXOP, respond to the channel reservation request signal by transmitting a channel reservation response signal (e.g., a CTS) in the next TXOP, and communicate with the serving BS in the next TXOP. The medium sharing module 408 may monitor for a channel reservation request signal from a high-priority node in a current TXOP and/or a channel reservation response signal from a high-priority node in a next TXOP, and determine whether to communicate with the serving BS in a next TXOP based on the monitoring.

In an embodiment, the medium sharing module 408 may receive a channel reservation request signal from a serving BS in a previous TXOP reserving a next TXOP, respond to the channel reservation request signal by transmitting a channel reservation response signal in the current TXOP, and communicate with the serving BS in the next TXOP. The medium sharing module 408 may monitor for a channel reservation request signal from a high-priority node in a previous TXOP and/or a channel reservation response signal from a high-priority node in a current TXOP and determine whether to communicate with the serving BS in a next TXOP based on the monitoring.

In an embodiment, the medium sharing module 408 may receive a channel reservation request signal from a serving BS in a beginning portion of a current TXOP reserving a next TXOP, respond to the channel reservation request signal by transmitting a channel reservation response signal in a later portion of the current TXOP, and communicate with the serving BS in the next TXOP. The medium sharing module 408 may monitor for a channel reservation request signal from a high-priority node in a beginning portion of a current TXOP and/or a channel reservation response signal from a high-priority node in a later portion of the current TXOP and determine whether to communicate with the serving BS in a next TXOP based on the monitoring.

In an embodiment, when link directions (e.g., UL and DL) are aligned among operators sharing a medium, the medium sharing module 408 may monitor for a channel reservation request signal from a high-priority BS without monitoring for a channel reservation response signal from a high-priority UE. Mechanisms for performing medium sharing with cross-slot or cross-TXOPs reservations are described in greater detail herein.

As shown, the transceiver 410 may include the modem subsystem 412 and the RF unit 414. The transceiver 410 can be configured to communicate bi-directionally with other devices, such as the BSs 105. The modem subsystem 412 may be configured to modulate and/or encode the data from the memory 404, and/or the medium sharing module 408 according to a modulation and coding scheme (MCS), e.g., a low-density parity check (LDPC) coding scheme, a turbo coding scheme, a convolutional coding scheme, a digital beamforming scheme, etc. The RF unit 414 may be configured to process (e.g., perform analog to digital conversion or digital to analog conversion, etc.) modulated/encoded data from the modem subsystem 412 (on outbound transmissions) or of transmissions originating from another source such as a UE 115 or a BS 105. The RF unit 414 may be further configured to perform analog beamforming in conjunction with the digital beamforming. Although shown as integrated together in transceiver 410, the modem subsystem 412 and the RF unit 414 may be separate devices that are coupled together at the UE 115 to enable the UE 115 to communicate with other devices.

The RF unit 414 may provide the modulated and/or processed data, e.g. data packets (or, more generally, data messages that may contain one or more data packets and other information), to the antennas 416 for transmission to one or more other devices. The antennas 416 may further receive data messages transmitted from other devices. The antennas 416 may provide the received data messages for processing and/or demodulation at the transceiver 410. The antennas 416 may include multiple antennas of similar or different designs in order to sustain multiple transmission links. The RF unit 414 may configure the antennas 416.

Figure 5:
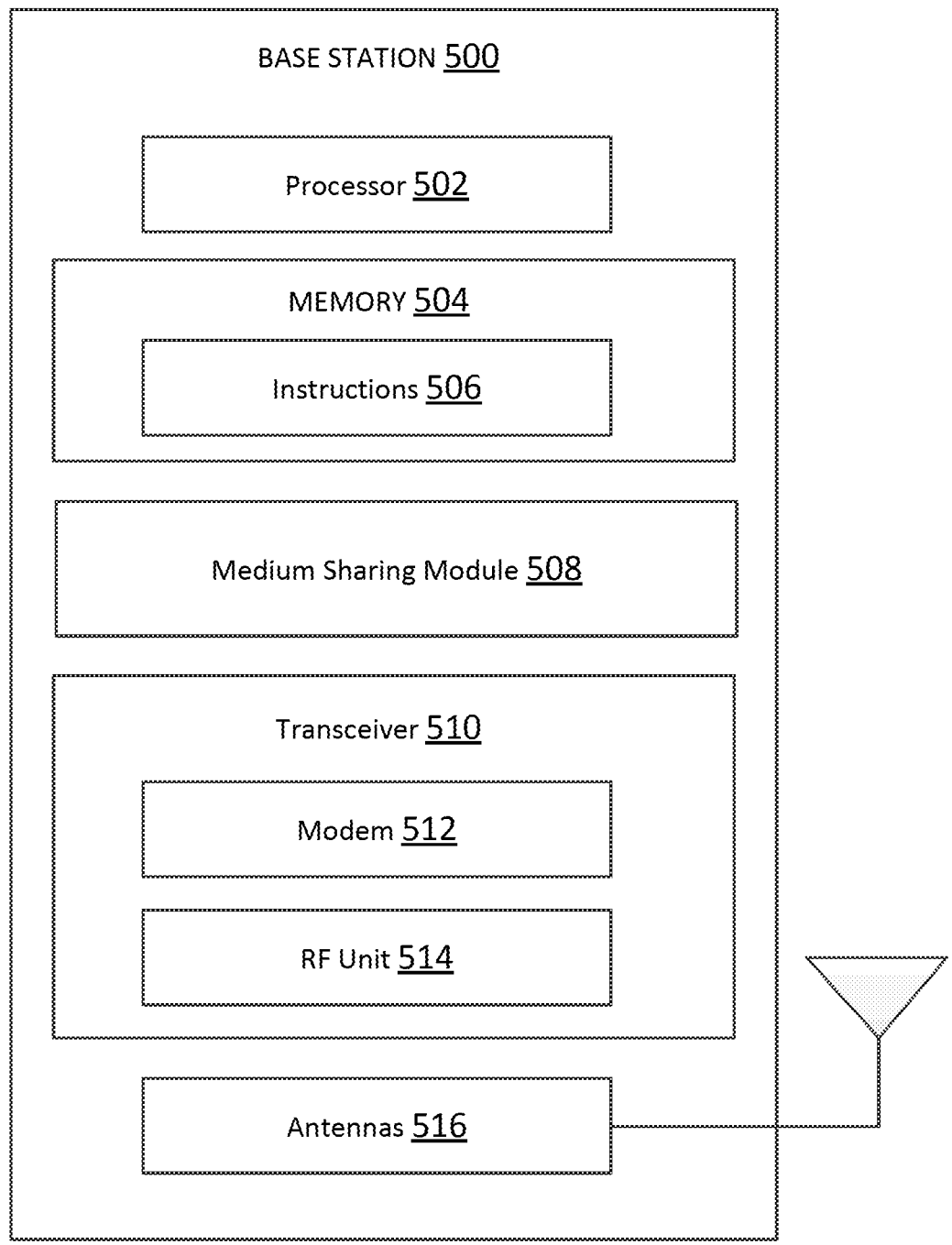
FIG. 5 is a block diagram of an exemplary base station (BS) according to some embodiments of the present disclosure.

FIG. 5 is a block diagram of an exemplary BS 500 according to embodiments of the present disclosure. The BS 500 may be a BS 105 or a BS 205 as discussed above. As shown, the BS 500 may include a processor 502, a memory 504, a medium sharing module 508, a transceiver 510 including a modem subsystem 512 and a RF unit 514, and one or more antennas 516. These elements may be in direct or indirect communication with each other, for example via one or more buses.

The processor 502 may have various features as a specific-type processor. For example, these may include a CPU, a DSP, an ASIC, a controller, a FPGA device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 504 may include a non-transitory computer-readable medium. The memory 504 may store instructions 506. The instructions 506 may include instructions that, when executed by the processor 502, cause the processor 502 to perform operations described herein. Instructions 506 may also be referred to as code, which may be interpreted broadly to include any type of computer-readable statement(s) as discussed above with respect to FIG. 5.

The medium sharing module 508 may be implemented via hardware, software, or combinations thereof. For example, the medium sharing module 508 may be implemented as a processor, circuit, and/or instructions 506 stored in the memory 504 and executed by the processor 502. The medium sharing module 508 may be used for various aspects of the present disclosure. For example, the medium sharing module 508 is configured to perform medium sensing by monitoring for a channel reservation request signal (e.g., the channel reservation request signal 320, an RTS signal, and/or a CTS trigger signal) and/or a channel reservation response signal (e.g., the channel reservation response signal 322) from high-priority nodes (e.g., the BSs 105 and 205 and/or the UEs 115 and 215), transmit a CTS trigger signal (e.g., a channel reservation request signal 320 including scheduling information) to a UE (e.g., the UEs 115 and 215) based on a prioritized access or an opportunistic access in a TXOP, monitor for a channel reservation response signal from the triggered UE, communicate with the triggered UE when a channel reservation response signal is received from the triggered UE, and/or yield spectrum access to a high-priority node based on medium sensing. The channel reservation request signal transmissions and/or the monitoring or medium sensing may be performed using various cross-slot or cross-TXOP reservation configurations.

In an embodiment, the medium sharing module 508 may transmit a channel reservation request signal (e.g., a CTS trigger) in a current TXOP (e.g., the TXOP 302) to reserve a next TXOP and trigger a UE for communication in the next TXOP, monitor for a channel reservation response signal (e.g., a CTS) from the triggered UE in the next TXOP, and communicate with the triggered UE in the next TXOP. The medium sharing module 508 may monitor for a channel reservation request signal from a high-priority node in a current TXOP and/or monitor for a channel reservation response signal from a high-priority node in a next TXOP and determine whether to communicate with a UE in the next TXOP based on the monitoring.

In an embodiment, the medium sharing module 508 may transmit a channel reservation request signal in a previous TXOP to reserve a next TXOP and trigger a UE for communication in the next TXOP, monitor for a channel reservation response signal from the triggered UE in the current TXOP, and communicate with the triggered UE in the next TXOP. The medium sharing module 508 may monitor for a channel reservation request signal from a high-priority node in a previous TXOP and/or a channel reservation response signal from a high-priority node in a current TXOP and determine whether to communicate with a UE in a next TXOP based on the monitoring.

In an embodiment, the medium sharing module 508 may transmit a channel reservation request signal in a beginning portion of a current TXOP to reserve a next TXOP and trigger a UE for communication in the next TXOP, monitor for a channel reservation response signal from the triggered UE in a later portion of the current TXOP, and communicate with the triggered UE in the next TXOP. The medium sharing module 508 may monitor for a channel reservation request signal from a high-priority node in a beginning portion of a current TXOP and/or a channel reservation response signal from a high-priority node in a later portion of the current TXOP and determine whether to communicate with a UE in a next TXOP based on the monitoring.

In an embodiment, when link directions (e.g., UL and DL) are aligned among operators sharing a medium, the medium sharing module 508 may monitor for a channel reservation response signal from a high-priority UE without monitoring for a channel reservation request signal from a high-priority BS. Mechanisms for performing medium sharing with cross-slot or cross-TXOP reservations are described in greater detail herein.

As shown, the transceiver 510 may include the modem subsystem 512 and the RF unit 514. The transceiver 510 can be configured to communicate bi-directionally with other devices, such as the UEs 115 and/or another core network element. The modem subsystem 512 may be configured to modulate and/or encode data according to a MCS, e.g., a LDPC coding scheme, a turbo coding scheme, a convolutional coding scheme, a digital beamforming scheme, etc. The RF unit 514 may be configured to process (e.g., perform analog to digital conversion or digital to analog conversion, etc.) modulated/encoded data from the modem subsystem 512 (on outbound transmissions) or of transmissions originating from another source such as a UE 115 or 400. The RF unit 514 may be further configured to perform analog beamforming in conjunction with the digital beamforming. Although shown as integrated together in transceiver 510, the modem subsystem 512 and/or the RF unit 514 may be separate devices that are coupled together at the BS 105 to enable the BS 105 to communicate with other devices.

The RF unit 514 may provide the modulated and/or processed data, e.g. data packets (or, more generally, data messages that may contain one or more data packets and other information), to the antennas 516 for transmission to one or more other devices. This may include, for example, transmission of information to complete attachment to a network and communication with a camped UE 115 or 400 according to embodiments of the present disclosure. The antennas 516 may further receive data messages transmitted from other devices and provide the received data messages for processing and/or demodulation at the transceiver 510. The antennas 516 may include multiple antennas of similar or different designs in order to sustain multiple transmission links.

FIGS. 6-9 illustrate various mechanisms for sharing a communication medium using cross-slot or cross-TXOP reservations to reduce medium sensing overhead. In FIGS. 6-9, the x-axes represent time in some constant units and the y-axes represent frequency in some constant units. The pattern-filled boxes with solid outlines represent signal transmissions. The pattern-filled boxes with dashed outlines represent potential opportunistic transmissions. The empty-filled boxes with dashed outlines represent LBT or medium sensing.

Figure 6:
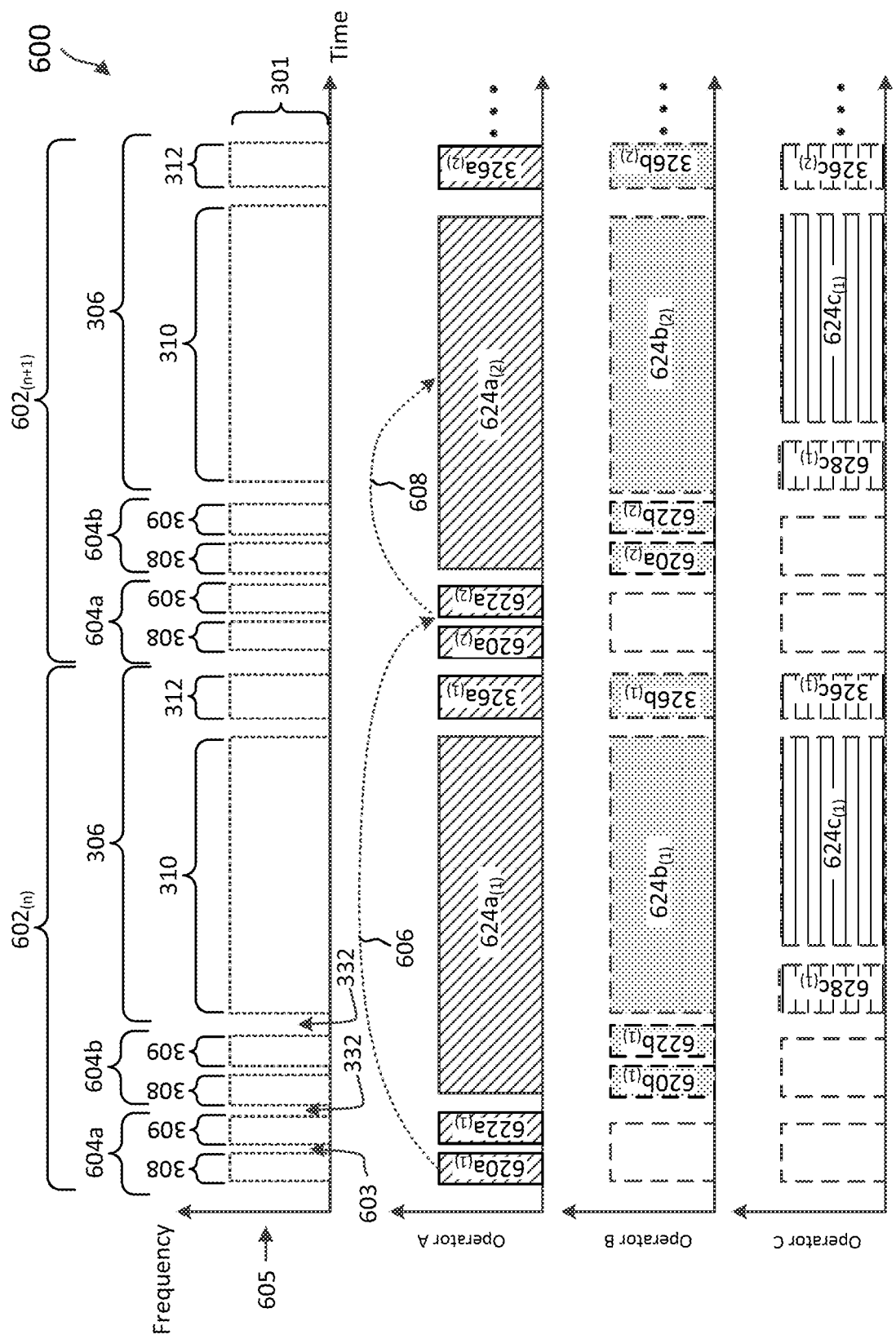
FIG. 6 illustrates a synchronized spectrum sharing scheme with cross-transmission opportunity (TXOP) reservations according to some embodiments of the present disclosure.

FIG. 6 illustrates a synchronized spectrum sharing scheme 600 with cross-TXOP reservations according to some embodiments of the present disclosure. The scheme 600 may be employed by BSs such as the BSs 105 and 205 and UEs such as the UEs 115 and 215 in a network such as the networks 100 and 200. The scheme 600 employs TXOPs 602 with a structure 605 for sharing a spectrum 301. The TXOPs 602 are substantially similar to the TXOPs 302. Each TXOP 602 includes a plurality of medium sensing periods 604 followed by a data transmission period 306. The medium sensing periods 604 are substantially similar to the medium sensing periods 304. The medium sensing periods 604 are arranged in a decreasing priority within a TXOP 602. Each medium sensing period 604 includes a reservation period 308 and a response period 309.

However, in the scheme 600, a BS may transmit a CTS trigger signal or a channel reservation request signal 620 (e.g., the channel reservation request signals 320) in a current TXOP $602_{(n)}$ to reserve a next TXOP $602_{(n+1)}$ for communication with a UE, where n is a positive integer. The triggered or scheduled UE may respond to the channel reservation request signal 620 received in the current TXOP $602_{(n)}$ by transmitting a channel reservation response signal 622 (e.g., the channel reservation response signals 322) in the next TXOP $602_{(n+1)}$. In other words, the scheme 600 delays the transmission of the channel reservation response signal 622 by one TXOP 602. The delaying of the channel reservation response signal 622 transmission allows time for the triggered UE to process the channel reservation request signal 620. As such, the scheme 600 can reduce the gap period 603 between the reservation period 308 and the response period 309 in each medium sensing period 604. For example, the gap period 603 may account for DL-UL switching time only, and thus may be significantly shorter than the gap period 330 in the scheme 300.

As an example, Operator A, Operator B, and Operator C may have decreasing access priorities in the TXOPs 602. Operator A may correspond to an MNO, Operator B may correspond to one private network (e.g., a factory network), and Operator C may correspond to another private network. A BS of Operator A may transmit a channel reservation request signal $620a_{(1)}$ in a TXOP $602_{(n)}$ to reserve a next TXOP $602_{(n+1)}$. The channel reservation request signal $602a_{(1)}$ is transmitted in the reservation period 308 of a medium sensing period 604a corresponding to Operator A's priority (e.g., highest priority) in the TXOP $602_{(n)}$. The channel reservation request signal $620a_{(1)}$ may trigger one or more UEs of Operator A for communications in the next TXOP $602_{(n+1)}$. A triggered UE may respond by transmitting a channel reservation response signal $622a_{(2)}$ in a corresponding response period 309 of the next TXOP $602_{(n+1)}$ as shown by the arrow 606. The channel reservation response signal $622a_{(2)}$ may protect communications between the BS and the UE in the TXOP $602_{(n+1)}$ as shown by the arrow 608. For example, the BS may communicate a communication signal $624a_{(2)}$ (e.g., including UL data or UL data) and a UL control signal $326a_{(2)}$ with the UE in the transmission period 306 of the TXOP $602_{(n+1)}$.

Operator B may opportunistically use a TXOP 602 when the TXOP 602 is not reserved by Operator A. To determine whether a TXOP $602_{(n)}$ is reserved by Operator A, an Operator B node (e.g., a BS or a UE) may monitor for a channel reservation response signal 622a in the medium sensing period 604a of the TXOP $602_{(n)}$. Alternatively or additionally, the Operator B node may also monitor for a channel reservation request signal 620a from Operator A in each TXOP 602 and determine whether a current TXOP $602_{(n)}$ is available for opportunistic access based on the monitoring in a previous TXOP $602_{(n-1)}$. A BS of Operator B may or may not use cross-TXOP reservations as used by Operator A.

In one embodiment, a BS of Operator B may use cross-TXOP reservations. For example, the BS may monitor for a channel reservation request signal 620a from Operator A in a TXOP $602_{(n)}$. When there is no channel reservation request signal 620a detected, the BS may transmit a channel reservation request signal $620b_{(1)}$ in the medium sensing period 604b of the TXOP $602_{(n)}$ to reserve a next TXOP $602_{(n+1)}$. The channel reservation request signal $620b_{(1)}$ may trigger one or more UEs of Operator B. A triggered UE may monitor for a channel reservation response signal 622a from Operator A in the medium sensing period 604a of the TXOP $602_{(n+1)}$. When there is no channel reservation response signal 622a detected, the triggered UE may respond by transmitting a channel reservation response signal $622b_{(2)}$ in the medium sensing period 604b of the TXOP $602_{(n+1)}$. Subsequently, the BS may communicate a communication signal $624b_{(2)}$ and a UL control signal $326b_{(2)}$ with the UE during the TXOP $602_{(n+1)}$.

In another embodiment, a BS of Operator B may not use cross-TXOP reservations. For example, the BS may monitor for a channel reservation response signal 622a from Operator A in a TXOP $602_{(n)}$. When there is no channel reservation response signal 622a detected, the BS may transmit a channel reservation request signal $620b_{(1)}$ in the medium sensing period 604b of the TXOP $602_{(n)}$ to reserve the TXOP $602_{(n)}$. The channel reservation request signal $620b_{(1)}$ may trigger one or more UEs of Operator B. A triggered UE may monitor for a channel reservation response signal 622a from Operator A in the TXOP $602_{(n)}$. When there is no channel reservation response signal 622a detected, the triggered UE may respond by transmitting a channel reservation response signal $622b_{(1)}$ in the medium sensing period 604b of the TXOP $602_{(n)}$. Subsequently, the BS may communicate a communication signal $624b_{(1)}$ and a UL control signal $326b_{(1)}$ with the UE during the TXOP $602_{(n)}$.

Similarly, Operator C may opportunistically use a TXOP 602 when the TXOP 602 is not reserved by Operator B. Operator C nodes may use substantially similar monitoring mechanisms as Operator B nodes to determine whether opportunistic access is available in a TXOP $602_{(n)}$. When a TXOP $602_{(n)}$ is available, a BS of Operator C may transmit a DL control signal $628c_{(1)}$ in the TXOP $602_{(n)}$. The DL control signal $628c_{(1)}$ may include a scheduling grant for a UE of Operator C. The BS may communicate a communication signal $624c_{(1)}$ and a UL controls signal $326c_{(1)}$ with the scheduled UE in the TXOP $602_{(n)}$.

To further reduce medium sensing overhead, a BS may transmit a channel reservation request signal 620 in the same symbol (e.g., OFDM symbol) as a channel reservation response signal 622 in a single frequency network (SFN) manner since the channel reservation response signal 622 is triggered by a channel reservation request signal 620 in a previous TXOP 602. Alternatively, the BS may transmit a channel reservation request signal 620 using one set of resource elements (e.g., frequency subcarriers), while the UE may transmit a channel reservation response signal 622 using another set of resource elements. The SFN-based transmissions of the channel reservation request signal 620 and the channel reservation response signal 622 can allow for better detection, while the separate transmissions of the channel reservation request signal 620 and the channel reservation response signal 622 can allow low-priority nodes to use separately adjust detection thresholds for detecting the channel reservation request signal 620 and for detecting the channel reservation response signal 622.

As can be seen, the scheme 600 introduces a scheduling delay of about one TXOP 602. To reduce the impact of the scheduling delay, a BS (e.g., of an MNO's BS) may choose to transmit the channel reservation request signal 620 before scheduling a UE for communications only when the scheduled UE experiences interference from low-priority nodes (e.g., private network nodes). The BS may determine whether a UE is subjected to interference from low-priority nodes based on measurements (e.g., receive signal strength indicator (RSSI) measurements) collected from the UE.

While the scheme 600 is described in the context of an MNO (e.g., Operator A) operating as a priority user of the spectrum, in some embodiments, the MNO may allow a private network (e.g., Operator B or C) to be a priority user in certain TXOPs 602 (e.g., in a round robin manner) depending on the traffic load of the MNO network. The sharing mechanisms among the different priority operators may remain the same. In addition, while FIG. 6 is illustrated with three operators, the scheme 600 can include a less number of operators (e.g., an MNO and one private network) or more operators (e.g., an MNO and three private networks).

Figure 7:
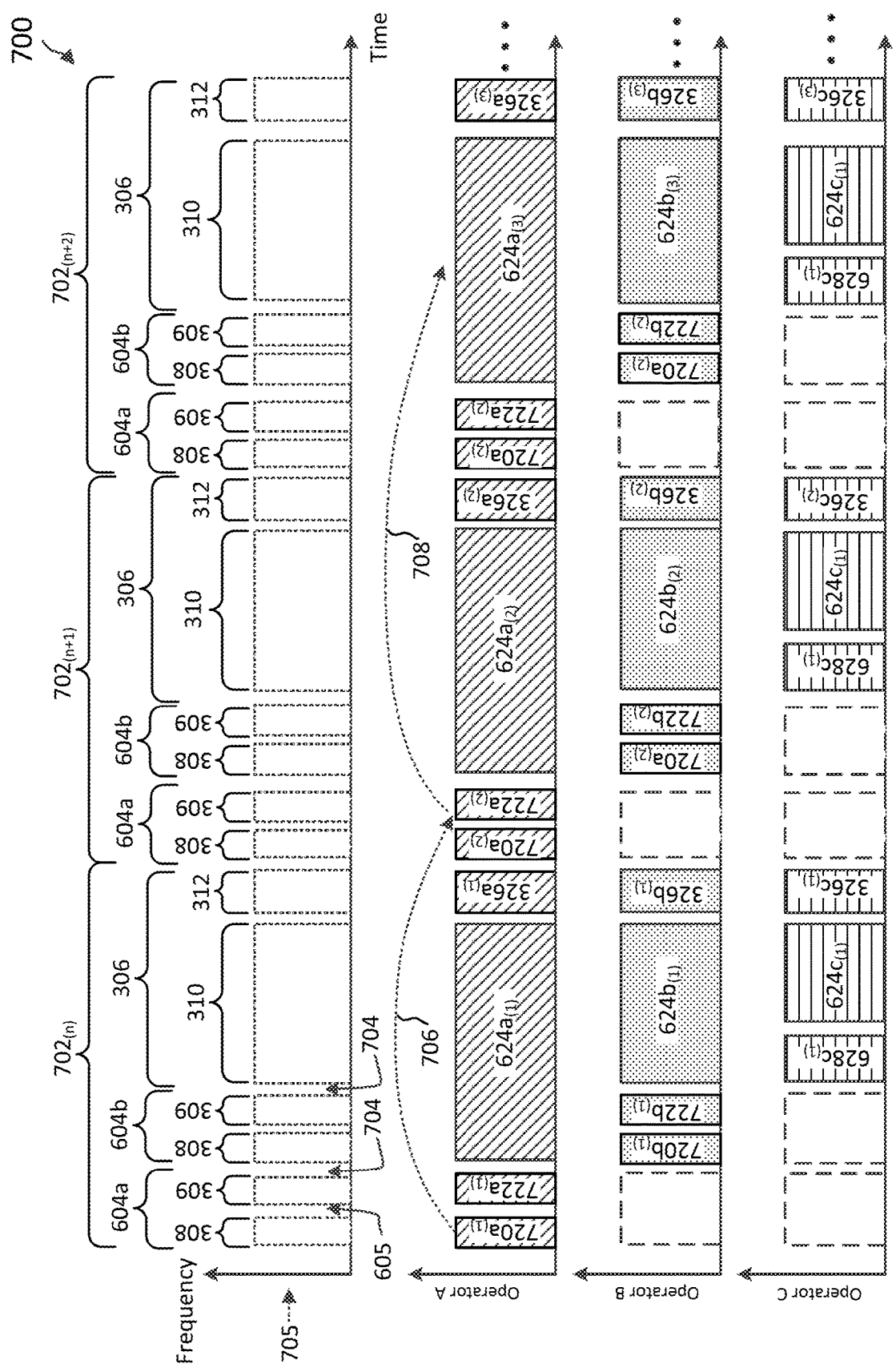
FIG. 7 illustrates a synchronized spectrum sharing scheme with cross-TXOP reservations according to some embodiments of the present disclosure.

FIG. 7 illustrates a synchronized spectrum sharing scheme 700 with cross-TXOP reservations according to some embodiments of the present disclosure. The scheme 700 may be employed by BSs such as the BSs 105 and 205 and UEs such as the UEs 115 and 215 in a network such as the networks 100 and 200. The scheme 700 employs TXOPs 702 with a structure 705 for sharing a spectrum 301. The TXOPs 702 are substantially similar to the TXOPs 602. However, in the scheme 700, a BS may transmit a CTS trigger signal or a channel reservation request signal 720 (e.g., the channel reservation request signals 320 and 620) in a TXOP $702_{(n)}$ to reserve a TXOP $702_{(n+2)}$ that is two TXOPs later for communication with a UE. The triggered or scheduled UE may respond to the channel reservation request signal 720 received in the TXOP $702_{(n)}$ by transmitting a channel reservation response signal 722 (e.g., the channel reservation response signals 622 and 322) in a next TXOP $702_{(n+1)}$. In other words, the scheme 700 delays the transmission of the channel reservation response signal 722 by one TXOP 702 similar to the scheme 600, but delays the schedule or communication (e.g., the communication signals 624) associated with the channel reservation by an additional TXOP 702. The delaying of the communication allows time for low-priority nodes to process the monitoring of the channel reservation response signal 722. As such, the scheme 700 can additionally reduce the gap period 704 after a medium sensing period 604. For example, the gap period 704 may account for DL-to-UL switching time only, and thus may be shorter than the gap period 332 in the schemes 300 and 600.

Similar to the scheme 600, Operator A may correspond to an MNO, Operator B may correspond to one private network, and Operator C may correspond to another private network and Operator A, Operator B, and Operator C may have decreasing access priorities in the TXOPs 702. A BS of Operator A may transmit a channel reservation request signal $720a_{(1)}$ in a TXOP $702_{(n)}$ to reserve a TXOP $602_{(n+2)}$. The channel reservation request signal $720a_{(1)}$ may trigger one or more UEs of Operator A for communications in the next TXOP $702_{(n+2)}$. A triggered UE may respond by transmitting a channel reservation response signal $722a_{(2)}$ in a next TXOP $702_{(n+1)}$ as shown by the arrow 706. The channel reservation response signal $722a_{(2)}$ in the TXOP $702_{(n+1)}$ may protect the communications (e.g., the communication signal $624a_{(3)}$ and a UL control signal $326a_{(3)}$) between the BS and the UE in the TXOP $702_{(n+2)}$ as shown by the arrow 708.

Operator B may opportunistically use a TXOP 702 when the TXOP 702 is not reserved by Operator A. To determine whether a TXOP $702_{(n)}$ is reserved by Operator A, an Operator B node (e.g., a BS or a UE) may monitor for a channel reservation response signal $722a$ in the medium sensing period $604a$ of the TXOP $702_{(n)}$. Alternatively or additionally, the Operator B node may also monitor for a channel reservation request signal $720a$ from Operator A in each TXOP 702 and determine whether a current TXOP $702_{(n)}$ is available for opportunistic access based on the monitoring in a TXOP $702_{(n-2)}$ that is two TXOPs 702 before the TXOP $702_{(n)}$.

Similar to the scheme 600, a BS of Operator B may or may not use cross-TXOP reservations as used by the Operator A. When the BS uses cross-TXOP reservations, the BS may monitor for a channel reservation request signal $720a$ in a TXOP $702_{(n)}$. When there is no channel reservation request signal $720a$ detected, the BS may transmit a channel reservation request signal $720b_{(1)}$ to reserve a later TXOP $702_{(n+2)}$. The channel reservation request signal $720b_{(1)}$ may trigger one or more UEs of Operator B to transmit a channel reservation response signal $722b$ in a next TXOP $702_{(n+1)}$. A triggered UE may monitor for a channel reservation response signal $722a$ from Operator A in the medium sensing period $604a$ of the TXOP $702_{(n+1)}$. When there is no channel reservation response signal $722a$ detected, the triggered UE may transmit a channel reservation response signal $722b_{(2)}$ in the TXOP $702_{(n+1)}$. Subsequently, the BS may communicate a communication signal $624b_{(3)}$ and a UL control signal $326b_{(3)}$ with the UE during the TXOP $702_{(n+2)}$.

Alternatively, when the BS does not use cross-TXOP reservations, the BS may monitor for a channel reservation response signal $722a$ from Operator A in a TXOP $702_{(n)}$. When there is no channel reservation request signal $720a$ detected, the BS may transmit a channel reservation request signal $720b_{(1)}$ in the medium sensing period $604b$ of the TXOP $702_{(n)}$ to reserve the TXOP $702_{(n)}$. The channel reservation request signal $720b_{(1)}$ may trigger one or more UEs of Operator B. A triggered UE may monitor for a channel reservation response signal $722a$ from Operator A in the TXOP $702_{(n)}$. When there is no channel reservation response signal $722a$ detected, the triggered UE may respond by transmitting a channel reservation response signal $722b_{(1)}$ in the medium sensing period $604b$ of the TXOP $702_{(n)}$. Subsequently, the BS may communicate a communication signal $624b_{(1)}$ and a UL control signal $326b_{(1)}$ with the UE during the TXOP $702_{(n)}$.

Similarly, Operator C may opportunistically use a TXOP 702 when the TXOP 702 is not reserved by Operator B and may use substantially similar monitoring mechanisms as Operator B nodes to determine whether opportunistic access is available in a TXOP $702_{(n)}$.

The scheme 700 may use similar mechanisms as in the scheme 600 to reduce medium sensing overhead. For example, a BS may transmit a channel reservation request signal 720 in the same symbol (e.g., OFDM symbol) as a channel reservation response signal 722 in a single frequency network manner Alternatively, the BS may transmit a channel reservation request signal 720 using one set of resource elements and the UE may transmit a channel reservation response signal 722 using another set of resource elements.

As can be seen, the scheme 700 introduces one slot delay or one TXOP 702 delay between the transmissions of a channel reservation request signal 720 and a corresponding channel reservation response signal 722 and an additional one TXOP 702 delay between the transmission of the channel reservation response signal 722 and a corresponding scheduled UL/DL data communication. Thus, the scheme 700 can have a scheduling delay of about two TXOPs 702. To reduce the impact of scheduling delay, a BS may use one slot scheduling delay for UEs that are not experiencing interference from low-priority nodes (e.g., private network nodes) and may use two slot scheduling delay for UEs that are experiencing interference from low-priority nodes.

While FIG. 7 is illustrated with three operators, the scheme 700 can include a less number of operators (e.g., an MNO and one private network) or more operators (e.g., an MNO and three private networks).

Figure 8:
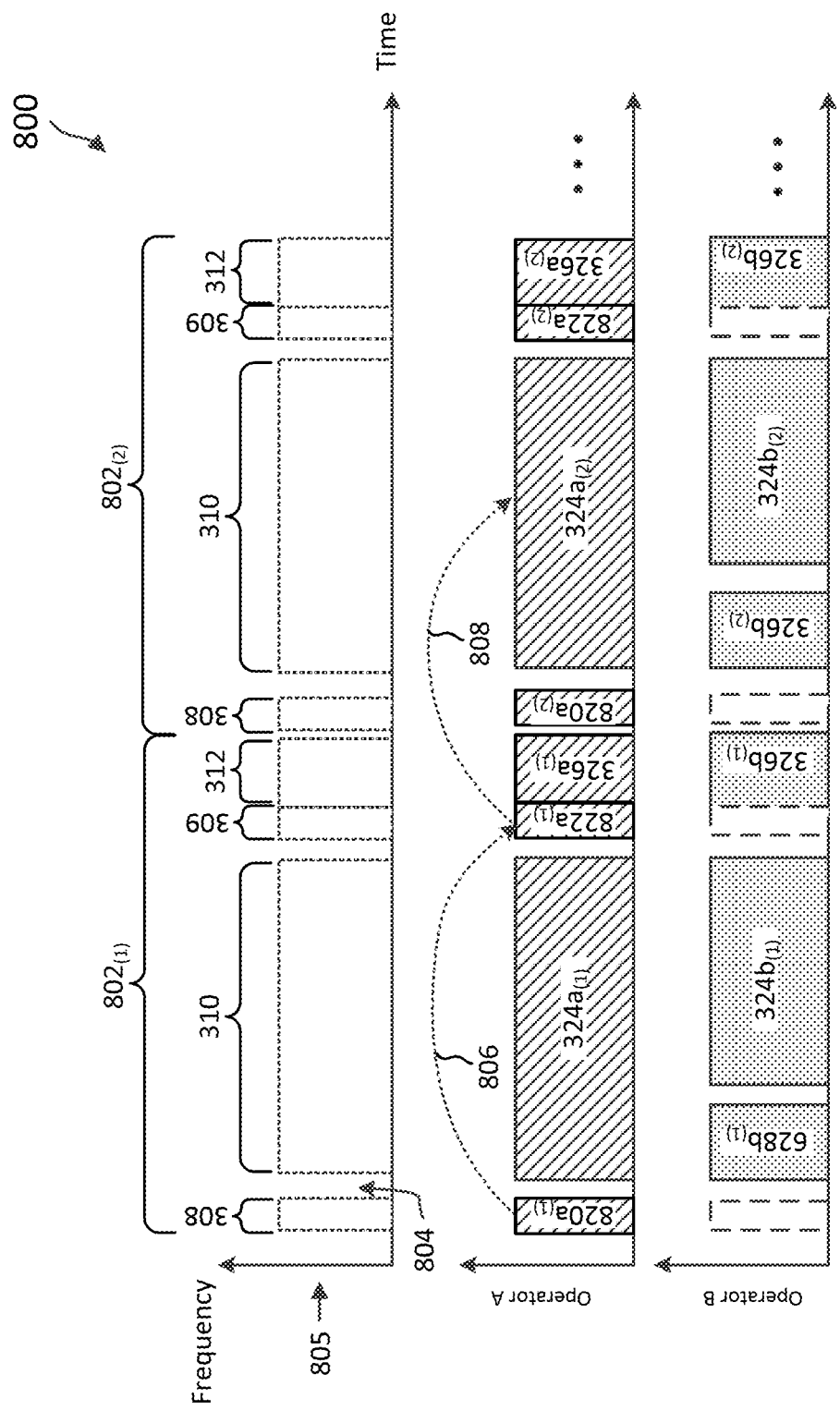
FIG. 8 illustrates a synchronized spectrum sharing scheme with cross-TXOP reservations according to some embodiments of the present disclosure.

FIG. 8 illustrates a synchronized spectrum sharing scheme 800 with cross-TXOP reservations according to some embodiments of the present disclosure. The scheme 800 may be employed by BSs such as the BSs 105 and 205 and UEs such as the UEs 115 and 215 in a network such as the networks 100 and 200. The scheme 800 employs TXOPs 802 with a structure 805 for sharing a spectrum 301. The scheme 800 employs TXOPs 802 with a structure 805 for sharing a spectrum 301. The TXOPs 802 are substantially similar to the TXOPs 602 and 702, but the response period 309 for a corresponding reservation period 308 is delayed to a later portion of the TXOP 802 instead of next to the reservation period 308 as in the schemes 600 and 700.

In the scheme 800, a BS may transmit a CTS trigger signal or a channel reservation request signal 820 (e.g., the channel reservation request signals 320, 620, and 720) in a TXOP $802_{(n)}$ to reserve a TXOP $802_{(n+1)}$ for communication with a UE. The triggered or scheduled UE may respond to the channel reservation request signal 820 received in the TXOP $802_{(n)}$ by transmitting a channel reservation response signal 822 (e.g., the channel reservation response signals 322, 622, and 722) in a response period 309 located at a later portion of the same TXOP $802_{(n)}$. The delaying of the transmission of the channel reservation response signal 822 to a later time can allow time for the triggered UE to process the channel reservation request signal 820. By keeping the transmission of the channel reservation response signal 822 in a TXOP 802 that is one TXOP 802 earlier than an intended or scheduled communication, lower priority nodes can allow time for a node to process the monitoring of the channel reservation response signal 822. Thus, the scheme 800 may provision for a short gap period 804 (e.g., for link direction switch) with a duration substantially similar to the short gap periods 603 and 704 in the scheme 700, but may reduce the scheduling delay from about two slots as in the scheme 700 to about one slot or one TXOP 802 as in the scheme 600.

Similar to the schemes 600 and 700, Operator A may correspond to an MNO and Operator B may correspond to a private network and Operator A may have priority over Operator B in the TXOPs 702. A BS of Operator A may transmit a channel reservation request signal $820a_{(1)}$ in a TXOP $802_{(n)}$ to reserve a TXOP $802_{(n+1)}$. The channel reservation request signal $820a_{(1)}$ may trigger one or more UEs of Operator A for communications in the next TXOP $802_{(n+1)}$. A triggered UE may respond by transmitting a channel reservation response signal $822a_{(1)}$ in a later portion (e.g., during the response period 309) of the same TXOP $802_{(n)}$ as shown by the arrow 806. The channel reservation response signal $822a_{(1)}$ in the TXOP $802_{(n)}$ may protect communications (e.g., a communication signal $624a_{(2)}$ and a UL control signal $326a_{(2)}$) between the BS and the UE in the next TXOP $602_{(n+1)}$ as shown by the arrow 808.

Operator B may opportunistically use a TXOP 802 when the TXOP 802 is not reserved by Operator A. To determine whether a TXOP $802_{(n+1)}$ is reserved by Operator A, an Operator B node may monitor for a channel reservation request signal $820a$ from Operator A during the reservation period 308 of the TXOP $802_{(n)}$ and/or a channel reservation response signal $822a$ from Operator A during the response period 309 of the TXOP $802_{(n)}$. When there is no channel reservation request signal $820a$ detected in the TXOP $802_{(n)}$, a BS of Operator B may transmit a DL control signal $628b_{(1)}$ in the TXOP $802(n_1)$. The DL control signal $628b_{(1)}$ may include a scheduling grant for a UE of Operator B. The BS may communicate a communication signal $624b_{(1)}$ and a UL controls signal $326c_{(1)}$ with the scheduled UE in the TXOP $802_{(n)}$.

While the scheme 800 illustrates the response period 309 to be located between the periods 310 and 312, the response period 309 can be alternatively configured to be located at any suitable time within the transmission period 310 as long as there is a sufficient amount of time between the reservation period 308 and the response period 309 for a triggered UE to process a channel reservation request signal 820 received in the reservation period 308 and a sufficient amount of time between the response period 309 and the beginning of a next transmission period 310 in a next TXOP 802 for low-priority nodes to process the channel reservation response signal 822. In addition, while FIG. 8 is illustrated with two operators, the scheme 800 can include more operators, for example, an MNO may coordinate and share a spectrum with three or more private networks.

An MNO may use any of the schemes 600-800 to coordinate and share a spectrum of the MNO with one or more other private networks irrespective of whether the private networks align communication link directions (e.g., UL and DL) with the MNO' s network. As described above, low-priority nodes (e.g., the BSs 105 and 205 and the UEs 115 and 215) may monitor for channel reservation request signals (e.g., the channel reservation request signals 620, 720, and 820) from high-priority BSs and channel reservation response signals (e.g., the channel reservation response signals 622, 722, and 822) from high-priority UEs for medium occupation in both UL and DL. When an MNO network and a private network have aligned communication link directions, the present disclosure provides techniques to allow for more opportunistic sharing.

Figure 9:
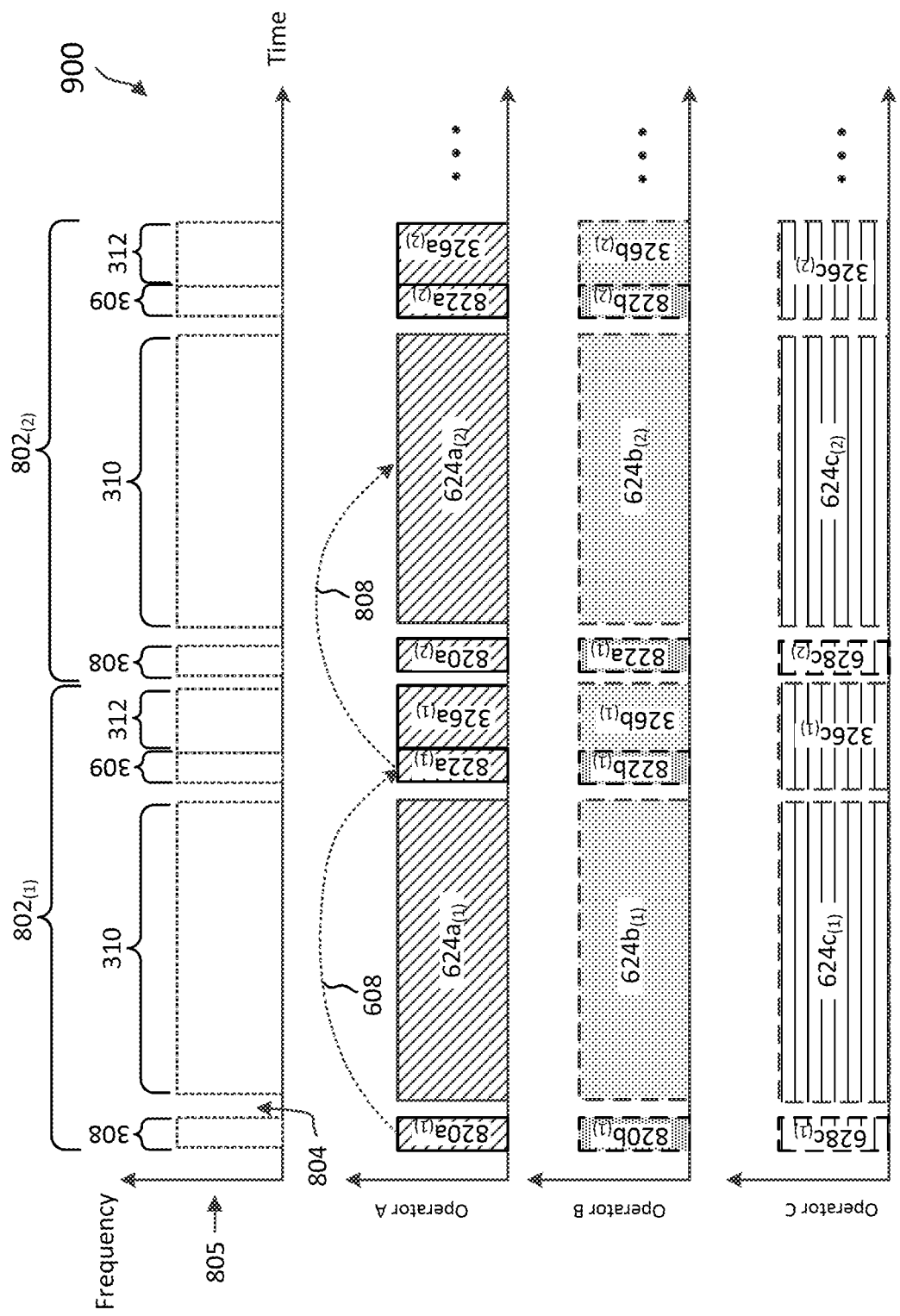
FIG. 9 illustrates a synchronized spectrum sharing scheme with cross-TXOP reservations according to some embodiments of the present disclosure.

FIG. 9 illustrates a synchronized spectrum sharing scheme 900 with cross-TXOP reservations according to some embodiments of the present disclosure. The scheme 900 may be employed by BSs such as the BSs 105 and 205 and UEs such as the UEs 115 and 215 in a network such as the networks 100 and 200. The scheme 900 is described using the same TXOP structure 805 as in the scheme 800. The scheme 900 can be used when all operators sharing a spectrum 301 have aligned communication link directions. In other words, Operator A and Operator B have the same UL/DL configurations for the TXOPs 802. For example, both Operator A and Operator B may use the TXOP $802_{(n)}$ for DL data communications and the TXOP $802_{(n+1)}$ for UL data communications.

In the scheme 900, a low-priority access point (AP) or BS (e.g., a BS of Operator B or a private network) may monitor for a channel reservation response signal 822 from a high-priority station (STA) or UE (e.g., a UE of Operator A or an MNO) without monitoring for a channel reservation request signal 820 from a high-priority AP or BS. Similarly, a low-priority STA or UE may monitor for a channel reservation request signal 820 from a high-priority AP or BS without monitoring for a channel reservation response signal 822 from a high-priority STA or UE. When a low-priority BS detects a channel reservation response signal 822 from a high-priority UE reserving a TXOP 802, the low-priority BS may not transmit in a DL direction during the TXOP 802. When a low-priority UE detects a channel reservation request signal 820 from a high-priority BS reserving a TXOP 802, the low-priority UE may not transmit in a UL direction during the TXOP 802.

Since a low-priority BS only needs to listen to a channel reservation response signal 822 from a high-priority UE and a low-priority UE only needs to listen to a channel reservation request signal 820 from a high-priority BS, the DL and/or UL control signals between operators (e.g., Operator A and Operator B) can be transmitted using frequency-division multiplexing (FDM) instead of time-division multiplexing (TDM) as in the schemes 600-800.

For example, a BS of Operator A, a BS of Operator B, and a BS of Operator C may simultaneously transmit a channel reservation request signal $820a_{(1)}$, a channel reservation request signal $820b_{(1)}$, and a DL control signal $628c_{(1)}$, respectively, during a period 308 of the TXOP $802_{(n)}$ using FDM. Similarly, a UE of Operator A, a UE of Operator B, and a UE of Operator C may simultaneously transmit a channel reservation response signal $822a_{(1)}$, a channel reservation response signal $822b_{(1)}$, and a UL control signal $326c_{(1)}$, respectively, during a period 309 using FDM. Thus, a low-priority UE may monitor for a channel reservation request signals 820 from a high-priority BS and a serving BS at the same time from different frequency bands within the spectrum 301. Similarly, a low-priority BS may monitor for a channel reservation response signals 822 from a high-priority UE and a UE triggered by the low-priority BS at the same time from different frequency bands within the spectrum 301.

As can be seen in FIG. 9, the scheme 900 does not require a separate medium sensing time period for a different priority as in the schemes 600, 700, and 800. Thus, the scheme 900 can further reduce medium sharing overheads when operators (e.g., an MNO and private networks) have aligned UL/DL split configurations. While the scheme 900 is described using the TXOP structure 805 of the scheme 800, similar FDM mechanisms can be applied to schemes 600 and 700 when all operating entities have the same UL/DL configurations.

Figure 10:
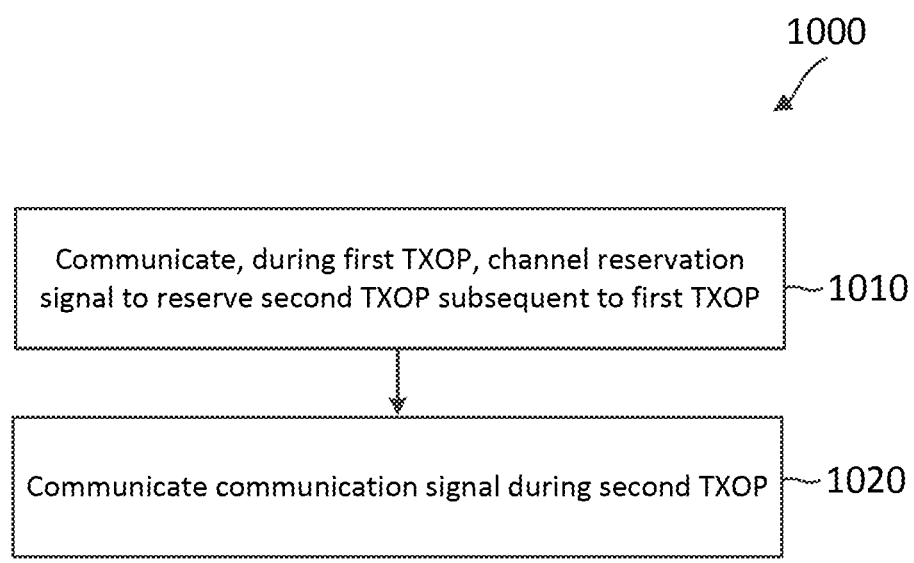
FIG. 10 is a flow diagram of a synchronized spectrum sharing method with cross-TXOP reservations according to some embodiments of the present disclosure.

FIG. 10 is a flow diagram of a synchronized medium sharing method 1000 with cross-TXOP reservations according to some embodiments of the present disclosure. Steps of the method 1000 can be executed by a computing device (e.g., a processor, processing circuit, and/or other suitable component) of a wireless communication device, such as the BSs 105, 205, and 500 and the UEs 115, 215, and 400. The method 1000 may employ similar mechanisms as in the schemes 300, 600, 700, 800, 900 described above with respect to FIGS. 3, 6, 7, 8, and 9, respectively. As illustrated, the method 1000 includes a number of enumerated steps, but embodiments of the method 1000 may include additional steps before, after, and in between the enumerated steps. In some embodiments, one or more of the enumerated steps may be omitted or performed in a different order.

At step 1010, the method 1000 includes communicating, by a first wireless communication device with a second wireless communication device during a first TXOP (e.g., the TXOPs 302, 602, 702, and 802) in a spectrum (e.g., the spectrum 301), a channel reservation signal to reserve a second TXOP subsequent to the first TXOP.

At step 1020, the method 1000 includes communicating, by the first wireless communication device with the second wireless communication device during the second TXOP, a communication signal.

In an embodiment, the first wireless communication device corresponds to a BS and the second wireless communication device corresponds to a UE. In another embodiment, the first wireless communication device corresponds to a UE and the second wireless communication device corresponds to a BS.

In an embodiment, the second TXOP is adjacent to the first TXOP. In an embodiment, when the first wireless communication device is a UE, the first wireless communication device transmits, in response to the channel reservation signal, a channel reservation response signal (e.g., the channel reservation response signal 622) during the second TXOP as in the scheme 600. In an embodiment, when the first wireless communication device is a UE, the first wireless communication device transmits, in response to the channel reservation signal, a channel reservation response signal (e.g., the channel reservation response signal 822) during the first TXOP as in the scheme 800. For example, the first TXOP includes a first time period (e.g., the reservation period 308 of a TXOP 802) and a second time period (e.g., the response period 309 of the TXOP 802) spaced apart by a third time period (e.g., the period 310 of the TXOP 802), the channel reservation signal is communicated during the first time period, and the channel reservation response signal is transmitted during the second time period.

In an embodiment, the first TXOP and the second TXOP are spaced apart by a third TXOP in the spectrum. In an embodiment, when the first wireless communication device is a UE, the first wireless communication device transmits, in response to the channel reservation signal, a channel reservation response signal during the third TXOP as in the scheme 700.

In an embodiment, the first TXOP and the second TXOP, each includes a single transmission slot (e.g., a self-contained slot with a UL portion and a DL portion).

In an embodiment, the spectrum is allocated to a first operator and shared by a second operator, and the first wireless communication device and second wireless communication device are associated with the first operator.

In an embodiment, the spectrum is allocated to a first operator and shared by a second operator, and the first wireless communication device and second wireless communication device are associated with the second operator.

Figure 11:
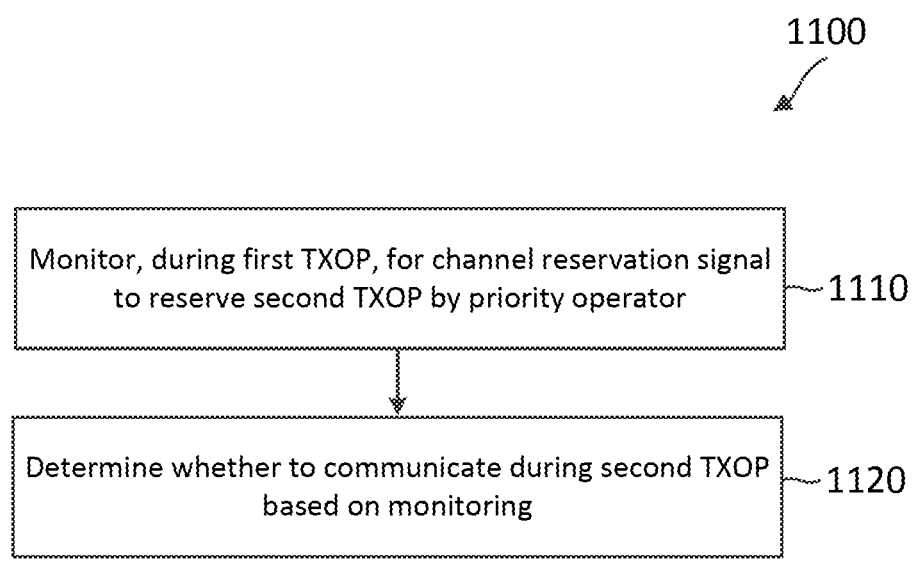
FIG. 11 is a flow diagram of a synchronized spectrum sharing method with cross-TXOP reservations according to some embodiments of the present disclosure.

FIG. 11 is a flow diagram of a synchronized medium sharing method 1100 with cross-TXOP reservations according to some embodiments of the present disclosure. Steps of the method 1100 can be executed by a computing device (e.g., a processor, processing circuit, and/or other suitable component) of a wireless communication device, such as the BSs 105, 205, and 500 and the UEs 115, 215, and 400. The method 1000 may employ similar mechanisms as in the schemes 300, 600, 700, 800, 900 described above with respect to FIGS. 3, 6, 7, 8, and 9, respectively. As illustrated, the method 1100 includes a number of enumerated steps, but embodiments of the method 1100 may include additional steps before, after, and in between the enumerated steps. In some embodiments, one or more of the enumerated steps may be omitted or performed in a different order.

At step 1110, the method 1100 includes monitoring, by a first wireless communication device during a first TXOP (e.g., the TXOPs 302, 602, 702, and 802) in a spectrum (e.g., the spectrum 301), for a channel reservation signal to reserve a second TXOP in the spectrum by a second wireless communication device of a priority operator. The second TXOP is subsequent to the first TXOP. The first wireless communication device may be operated by a first operator. The second wireless communication device may be operated by a second operator having a higher access priority than the first operator.

At step 1120, the method 1100 includes determining, by the first wireless communication device, whether to communicate with a third wireless communication device during the second TXOP based on the monitoring. The first and third wireless communication devices may be operated by a first operator. The second wireless communication device may be operated by a second operator having a higher access priority than the first operator.

In an embodiment, the first wireless communication device corresponds to a BS and the second wireless communication device corresponds to a UE. In another embodiment, the first wireless communication device corresponds to a UE and the second wireless communication device corresponds to a BS.

In an embodiment, the second TXOP is adjacent to the first TXOP. In an embodiment, the channel reservation signal includes at least one of a channel reservation request (e.g., the channel reservation request signals 620 and 820) for the second TXOP as in the schemes 600 and 800 or a channel reservation response (e.g., the channel reservation response signals 722) to a channel reservation request (e.g., the channel reservation request signals 720) communicated during a third TXOP in the spectrum as in the scheme 700, the third TXOP being before the first TXOP. In an embodiment, the first TXOP includes a first time period and a second time period spaced apart by a third time period, wherein the first wireless communication device monitors for at least one of a channel reservation request for the second TXOP during the first time period (e.g., the reservation period 308 of a TXOP 802) or a channel reservation response for the second TXOP during the second time period (e.g., the response period of the TXOP 802) as in the scheme 800.

In an embodiment, the first TXOP and the second TXOP are spaced apart by a third TXOP.

In an embodiment, the first wireless communication device transmits, during the first TXOP, a channel reservation signal to reserve the second TXOP for communicating with the third wireless communication device. The first wireless communication device monitors, in a first subband of the spectrum during a time period within the first TXOP, for a channel reservation response signal from the third wireless communication device. The channel reservation signal of the priority operator is monitored in a second subband of the spectrum different from the first subband during the time period. The first subband and the second subband are configured based on a FDM scheme. The determining is further based on the monitoring of the channel reservation response signal from the third wireless communication device.

In an embodiment, the first wireless communication device receives, in a first subband of the spectrum during a time period within the first TXOP, a channel reservation signal from the third wireless communication device reserving the second TXOP. The channel reservation signal of the priority operator is monitored in a second subband of the spectrum different from the first subband during the time period. The first subband and the second subband are configured based on a FDM scheme. The determining is in response to the channel reservation signal received from the third wireless communication device.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Embodiments of the present disclosure further include a computer-readable medium having program code recorded thereon, the program code includes code for causing a first wireless communication device to communicate, with a second wireless communication device during a first transmission opportunity (TXOP) in a spectrum, a channel reservation signal to reserve a second TXOP in the spectrum subsequent to the first TXOP; and code for causing the first wireless communication device to communicate, with the second wireless communication device during the second TXOP, a communication signal.

In some embodiments, the second TXOP is adjacent to the first TXOP. In some embodiments, the computer-readable medium further comprises code for causing the first wireless communication device to transmit, in response to the channel reservation signal, a channel reservation response signal during the second TXOP. In some embodiments, the computer-readable medium further comprises code for causing the first wireless communication device to transmit, in response to the channel reservation signal, a channel reservation response signal during the first TXOP. In some embodiments, the first TXOP includes a first time period and a second time period spaced apart by a third time period, wherein the channel reservation signal is communicated during the first time period, and wherein the channel reservation response signal is transmitted during the second time period. In some embodiments, the first TXOP and the second TXOP are spaced apart by a third TXOP. In some embodiments, the computer-readable medium further comprises code for causing the first wireless communication device to transmit, in response to the channel reservation signal, a channel reservation response signal during the third TXOP. In some embodiments, the second TXOP includes a single transmission slot for communicating the communication signal. In some embodiments, the spectrum is allocated to a first operator and shared by a second operator, and wherein the first wireless communication device and second wireless communication device are associated with the first operator. In some embodiments, the spectrum is allocated to a first operator and shared by a second operator, and wherein the first wireless communication device and second wireless communication device are associated with the second operator.

Embodiments of the present disclosure further include a computer-readable medium having program code recorded thereon, the program code includes code for causing a first wireless communication device to monitor, during a first transmission opportunity (TXOP) in a spectrum, for a channel reservation signal to reserve a second TXOP in the spectrum by a second wireless communication device of a priority operator, the second TXOP being subsequent to the first TXOP; and code for causing the first wireless communication device to determine whether to communicate with a third wireless communication device during the second TXOP based on the monitoring.

In some embodiments, the second TXOP is adjacent to the first TXOP. In some embodiments, the channel reservation signal includes at least one of a channel reservation request for the second TXOP; or a channel reservation response to a channel reservation request communicated during a third TXOP in the spectrum, the third TXOP being before the first TXOP. In some embodiments, the first TXOP includes a first time period and a second time period spaced apart by a third time period, and wherein the code for causing the first wireless communication device to monitor for the channel reservation signal is further configured to monitor for at least one of a channel reservation request for the second TXOP during the first time period; or a channel reservation response for the second TXOP during the second time period. In some embodiments, the first TXOP and the second TXOP are spaced apart by a third TXOP. In some embodiments, the computer-readable medium further comprises code for causing the first wireless communication device to transmit, during the first TXOP, a channel reservation signal to reserve the second TXOP for communicating with the third wireless communication device; and code for causing the first wireless communication device to monitor, in a first subband of the spectrum during a time period within the first TXOP, for a channel reservation response signal from the third wireless communication device, wherein the channel reservation signal of the priority operator is monitored in a second subband of the spectrum different from the first subband during the time period, and wherein the code for causing the first wireless communication device to determine whether to communicate with the third wireless communication device during the second TXOP is further based on the monitoring of the channel reservation response signal from the third wireless communication device. In some embodiments, the computer-readable medium further comprises code for causing the first wireless communication device to receive, a first subband of the spectrum during a time period within the first TXOP, a channel reservation signal from the third wireless communication device reserving the second TXOP, wherein the channel reservation signal of the priority operator is monitored in a second subband of the spectrum different from the first subband during the time period, and wherein the code for causing the first wireless communication device to determine whether to communicate with the third wireless communication device during the second TXOP is further in response to the channel reservation signal received from the third wireless communication device.

Embodiments of the present disclosure further include an apparatus comprising means for communicating, with a second wireless communication device during a first transmission opportunity (TXOP) in a spectrum, a channel reservation signal to reserve a second TXOP in the spectrum subsequent to the first TXOP; and means for communicating, with the second wireless communication device during the second TXOP, a communication signal.

In some embodiments, the second TXOP is adjacent to the first TXOP. In some embodiments, the apparatus further comprises means for transmitting, in response to the channel reservation signal, a channel reservation response signal during the second TXOP. In some embodiments, the apparatus further comprises means for transmitting, in response to the channel reservation signal, a channel reservation response signal during the first TXOP. In some embodiments, the first TXOP includes a first time period and a second time period spaced apart by a third time period, wherein the channel reservation signal is communicated during the first time period, and wherein the channel reservation response signal is transmitted during the second time period. In some embodiments, the first TXOP and the second TXOP are spaced apart by a third TXOP. In some embodiments, the apparatus further comprises means for transmitting, in response to the channel reservation signal, a channel reservation response signal during the third TXOP. In some embodiments, wherein the second TXOP includes a single transmission slot for communicating the communication signal. In some embodiments, the spectrum is allocated to a first operator and shared by a second operator, and wherein the first wireless communication device and second wireless communication device are associated with the first operator. In some embodiments, the spectrum is allocated to a first operator and shared by a second operator, and wherein the first wireless communication device and second wireless communication device are associated with the second operator.

Embodiments of the present disclosure further include an apparatus including means for monitoring, during a first transmission opportunity (TXOP) in a spectrum, for a channel reservation signal to reserve a second TXOP in the spectrum by a second wireless communication device of a priority operator, the second TXOP being subsequent to the first TXOP; and means for determining whether to communicate with a third wireless communication device during the second TXOP based on the monitoring.

In some embodiments, the second TXOP is adjacent to the first TXOP. In some embodiments, the channel reservation signal includes at least one of a channel reservation request for the second TXOP; or a channel reservation response to a channel reservation request communicated during a third TXOP in the spectrum, the third TXOP being before the first TXOP. In some embodiments, the first TXOP includes a first time period and a second time period spaced apart by a third time period, and wherein the means for monitoring for the channel reservation signal is further configured to monitor for at least one of a channel reservation request for the second TXOP during the first time period; or a channel reservation response for the second TXOP during the second time period. In some embodiments, the first TXOP and the second TXOP are spaced apart by a third TXOP. In some embodiments, the apparatus further comprises means for transmitting, during the first TXOP, a channel reservation signal to reserve the second TXOP for communicating with the third wireless communication device; and means for monitoring, in a first subband of the spectrum during a time period within the first TXOP, for a channel reservation response signal from the third wireless communication device, wherein the channel reservation signal of the priority operator is monitored in a second subband of the spectrum different from the first subband during the time period, and wherein the means for determining whether to communicate with the third wireless communication device during the second TXOP is further based on the monitoring of the channel reservation response signal from the third wireless communication device. In some embodiments, the apparatus further comprises means for receiving, a first subband of the spectrum during a time period within the first TXOP, a channel reservation signal from the third wireless communication device reserving the second TXOP, wherein the channel reservation signal of the priority operator is monitored in a second subband of the spectrum different from the first subband during the time period, and wherein the means for determining whether to communicate with the third wireless communication device during the second TXOP is further in response to the channel reservation signal received from the third wireless communication device.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
   communicating, by a first wireless communication device with a second wireless communication device during a first transmission opportunity (TXOP) in a spectrum, a channel reservation signal to reserve a second TXOP in the spectrum subsequent to the first TXOP;
   communicating, by the first wireless communication device with the second wireless communication device, a channel reservation response signal during at least one of the first TXOP or the second TXOP in response to the channel reservation signal, wherein the channel reservation signal and the channel reservation response signal are spaced apart in time by a transmission period; and
   communicating, by the first wireless communication device with the second wireless communication device during the second TXOP, a communication signal in response to the channel reservation signal and the channel reservation response signal.

2. The method of claim 1, wherein the second TXOP is adjacent to the first TXOP.

3. The method of claim 2, wherein the communicating the channel reservation signal includes:
   transmitting, by the first wireless communication device in response to the channel reservation signal, the channel reservation response signal during the second TXOP.

4. The method of claim 2, wherein the communicating the channel reservation signal includes:
   transmitting, by the first wireless communication device in response to the channel reservation signal, the channel reservation response signal during the first TXOP.

5. The method of claim 4, wherein the first TXOP includes a first time period and a second time period spaced apart by the transmission period, wherein the channel reservation signal is communicated during the first time period, and wherein the channel reservation response signal is transmitted during the second time period.

6. The method of claim 1, wherein the each of the first TXOP and the second TXOP includes a single transmission slot for communicating the communication signal.

7. The method of claim 1, wherein the spectrum is allocated to a first operator and shared by a second operator, and wherein the first wireless communication device and the second wireless communication device are associated with the first operator.

8. The method of claim 1, wherein the spectrum is allocated to a first operator and shared by a second operator, and wherein the first wireless communication device and the second wireless communication device are associated with the second operator.

9. A method of wireless communication, comprising:
   monitoring, by a first wireless communication device during a first transmission opportunity (TXOP) in a spectrum from a second wireless communication device of a priority operator, for a channel reservation signal indicating a reservation for a second TXOP in the spectrum, the second TXOP being subsequent to the first TXOP; and
   determining, by the first wireless communication device, whether to communicate with a third wireless communication device different from the second wireless communication device during the second TXOP based on the monitoring.

10. The method of claim 9, wherein the second TXOP is adjacent to the first TXOP.

11. The method of claim 10, wherein the channel reservation signal includes at least one of:
   a channel reservation request for the second TXOP; or
   a channel reservation response to a channel reservation request communicated during a third TXOP in the spectrum, the third TXOP being before the first TXOP.

12. The method of claim 10, wherein the first TXOP includes a first time period and a second time period spaced apart by a third time period, and wherein the monitoring includes at least one of:
- monitoring, by the first wireless communication device, for a channel reservation request for the second TXOP during the first time period; or
- monitoring, by the first wireless communication device, for a channel reservation response for the second TXOP during the second time period.

13. The method of claim 9, wherein the first TXOP and the second TXOP are spaced apart by a third TXOP.

14. The method of claim 9, further comprising:
- transmitting, by the first wireless communication device during the first TXOP, a channel reservation signal to reserve the second TXOP for communicating with the third wireless communication device; and
- monitoring, by the first wireless communication device in a first subband of the spectrum during a time period within the first TXOP, for a channel reservation response signal from the third wireless communication device,
- wherein the channel reservation signal of the priority operator is monitored in a second subband of the spectrum different from the first subband during the time period, and
- wherein the determining is further based on the monitoring of the channel reservation response signal from the third wireless communication device.

15. The method of claim 9, further comprising:
- receiving, by the first wireless communication device in a first subband of the spectrum during a time period within the first TXOP, a channel reservation signal from the third wireless communication device reserving the second TXOP,
- wherein the channel reservation signal of the priority operator is monitored in a second subband of the spectrum different from the first subband during the time period, and
- wherein the determining is in response to the channel reservation signal received from the third wireless communication device.

16. An apparatus comprising:
a transceiver configured to:
- communicate, with a wireless communication device during a first transmission opportunity (TXOP) in a spectrum, a channel reservation signal to reserve a second TXOP in the spectrum subsequent to the first TXOP;
- communicate, with the wireless communication device, a channel reservation response signal during at least one of the first TXOP or the second TXOP in response to the channel reservation signal, wherein the channel reservation signal and the channel reservation response signal are spaced apart in time by a transmission period; and
- communicate, with the wireless communication device during the second TXOP, a communication signal in response to the channel reservation signal and the channel reservation response signal.

17. The apparatus of claim 16, wherein the second TXOP is adjacent to the first TXOP.

18. The apparatus of claim 17, wherein the transceiver configured to communicate the channel reservation response signal is configured to:
- transmit, in response to the channel reservation signal, the channel reservation response signal during the second TXOP.

19. The apparatus of claim 17, wherein the first TXOP includes a first time period and a second time period spaced apart by the transmission period, wherein the channel reservation signal is communicated during the first time period, and wherein the transceiver is further configured to communicate the channel reservation response signal is configured to:
- transmit, in response to the channel reservation signal, the channel reservation response signal during the second time period of the first TXOP.

20. An apparatus comprising:
a processor configured to:
- monitor, during a first transmission opportunity (TXOP) in a spectrum from a first wireless communication device of a priority operator, for a channel reservation signal indicating a reservation for a second TXOP in the spectrum, the second TXOP being subsequent to the first TXOP; and
- determine whether to communicate with a second wireless communication device different from the first wireless communication device during the second TXOP based on the monitoring.

21. The apparatus of claim 20, wherein the second TXOP is adjacent to the first TXOP.

22. The apparatus of claim 21, wherein the channel reservation signal includes at least one of:
- a channel reservation request for the second TXOP; or
- a channel reservation response to a channel reservation request communicated during a third TXOP in the spectrum, the third TXOP being before the first TXOP.

23. The apparatus of claim 21, wherein the first TXOP includes a first time period and a second time period spaced apart by a third time period, and wherein the processor is further configured to monitor the channel reservation signal by at least one of:
- monitoring for a channel reservation request for the second TXOP during the first time period; or
- monitoring for a channel reservation response for the second TXOP during the second time period.

24. The apparatus of claim 20, wherein the first TXOP and the second TXOP are spaced apart by a third TXOP.

25. The apparatus of claim 20, further comprising a transceiver configured to:
- transmit, during the first TXOP, a channel reservation request signal to reserve the second TXOP for communicating with the second wireless communication device,
- wherein the processor is further configured to monitor, in a first subband of the spectrum during a time period within the first TXOP, for a channel reservation response signal from the second wireless communication device,
- wherein the channel reservation signal of the priority operator is monitored in a second subband of the spectrum different from the first subband during the time period, and
- wherein the determination is further based on the monitoring of the channel reservation response signal from the second wireless communication device.

26. The apparatus of claim 20, further comprising a transceiver configured to:
- receive, in a first subband of the spectrum during a time period within the first TXOP, a channel reservation signal from the second wireless communication device reserving the second TXOP, wherein the channel reservation signal of the priority operator is monitored in a second subband of the spectrum different from the first subband during the time period, and wherein the determination is in response to the channel reservation signal received from the second wireless communication device.

* * * * *